United States Patent
Miyazaki et al.

(10) Patent No.: US 7,664,060 B2
(45) Date of Patent: Feb. 16, 2010

(54) INFORMATION TERMINAL AND INFORMATION TERMINAL SYSTEM

(75) Inventors: Tomiya Miyazaki, Fukuoka (JP); Yutaka Takeda, Fukuoka (JP); Kazuo Yahiro, Fukuoka (JP); Takuji Tsujigawa, Fukuoka (JP); Naoki Koga, Fukuoka (JP); Keisuke Ogata, Fukuoka (JP); Akitoshi Aritaka, Fukuoka (JP)

(73) Assignee: Panasonic Corporation, Osaka (JP)

(*) Notice: Subject to any disclaimer, the term of this patent is extended or adjusted under 35 U.S.C. 154(b) by 558 days.

(21) Appl. No.: 11/282,493

(22) Filed: Nov. 18, 2005

(65) Prior Publication Data
US 2006/0092965 A1    May 4, 2006

Related U.S. Application Data

(63) Continuation of application No. 09/731,495, filed on Dec. 7, 2000, now Pat. No. 7,054,303.

(30) Foreign Application Priority Data

Dec. 7, 1999  (JP) ................... 11-347133
Jan. 27, 2000  (JP) ................... 2000-018457
Jan. 27, 2000  (JP) ................... 2000-018459

(51) Int. Cl.
   *H04B 3/36* (2006.01)
(52) U.S. Cl. .............. 370/293; 370/348; 370/464; 455/402
(58) Field of Classification Search ................ None
   See application file for complete search history.

(56) References Cited

U.S. PATENT DOCUMENTS

| | | | |
|---|---|---|---|
| 4,821,265 A | 4/1989 | Albal et al. | |
| 5,231,634 A * | 7/1993 | Giles et al. ................ | 370/348 |
| 5,268,666 A | 12/1993 | Michel et al. | |
| 5,717,751 A | 2/1998 | Yagi et al. | |
| 5,742,596 A | 4/1998 | Baratz et al. | |
| 5,831,980 A * | 11/1998 | Varma et al. ........... | 370/395.72 |
| 6,111,570 A | 8/2000 | Sugikawa et al. | |
| 6,130,893 A | 10/2000 | Whittaker et al. | |
| 6,404,773 B1 | 6/2002 | Williams et al. | |
| 6,407,987 B1 * | 6/2002 | Abraham .................... | 370/295 |

(Continued)

FOREIGN PATENT DOCUMENTS

JP    6-086362    3/1994

(Continued)

*Primary Examiner*—Robert W Wilson
(74) *Attorney, Agent, or Firm*—RatnerPrestia

(57) ABSTRACT

An information terminal incorporates a network interface and an extension interface, and in the case of outside call, an audio send signal is modulated into an audio signal frequency band, and sent to the exchange through a private telephone line and a subscriber's line by way of the network interface. An audio receive signal sent from the exchange through the subscriber's line and private telephone line is demodulated into an ordinary audio frequency band through the network interface. On the other hand, in the case of extension service, an audio send signal is converted into a packetized digital signal by an extension interface circuit, and is further modulated into a higher frequency band so as not to overlap with the audio signal frequency band, and is transmitted through the private telephone line.

18 Claims, 23 Drawing Sheets

U.S. PATENT DOCUMENTS

| | | |
|---|---|---|
| 6,434,123 B1 * | 8/2002 | Park .......................... 370/293 |
| 6,480,510 B1 | 11/2002 | Binder |
| 6,549,906 B1 | 4/2003 | Austin et al. |
| 6,580,710 B1 | 6/2003 | Bowen et al. |
| 6,668,328 B1 | 12/2003 | Bell |
| 6,731,627 B1 | 5/2004 | Gupta et al. |
| 7,054,303 B2 * | 5/2006 | Miyazaki et al. ............ 370/352 |

FOREIGN PATENT DOCUMENTS

| | | |
|---|---|---|
| JP | 07-193861 | 7/1995 |
| JP | 07-336432 | 12/1995 |
| JP | 11-075229 | 3/1999 |

* cited by examiner

FIG. 21

Memory

| Message No. | Receiving date | Sender | Message identifier |
|---|---|---|---|
| 1 | 2000/1/1 | Information terminal 3 | Audio |
| 2 | 2000/1/3 | Outside line 03-0123-4567 | Text |
| 3 | 2000/1/15 | Information terminal 6 | Audio |
| 4 | 2000/1/27 | Information terminal 2 | Image |
| 5 | 2000/2/1 | Information terminal 3 | Text |
| — | | | |
| — | | | |

INFORMATION TERMINAL AND INFORMATION TERMINAL SYSTEM

This application is a continuation of U.S. patent application Ser. No. 09/731,495, filed Dec. 7, 2000, now U.S. Pat. No. 7,054,330 the contents of which are incorporated herein by reference.

FIELD OF THE INVENTION

The present invention relates to an information terminal and an information terminal system having outside call and extension functions.

BACKGROUND OF THE INVENTION

To begin with, a conventional information terminal is explained.

FIG. 22 is a configuration diagram of a conventional extension telephone system, and FIG. 23 is a frequency band diagram for audio signal of the conventional extension telephone system. The operation is explained below while referring to FIG. 22 and FIG. 23.

Hitherto, the information terminal having the extension function is classified into a main apparatus 1 and information terminals 2 and 3.

The flow of an audio signal for an outside call sent from the information terminal 2 is as follows: the audio signal entered from a microphone 11 is modulated by a modulator 9 into an audio signal frequency band 19 in FIG. 23, and is demodulated into an ordinary audio signal (telephone signal frequency band 18 in FIG. 23) by a demodulator 6 of the main apparatus 1 through a private telephone line 17. It is then sent to an exchange through a subscriber's line 60 by a network interface circuit 4 of the main apparatus 1.

To the contrary, the flow of an audio signal received at information terminal 2 is as follows: the audio signal sent from the exchange through the subscriber's line 60 is modulated into an audio signal frequency band 20 by the modulator 5 in the main apparatus 1, and is demodulated into an ordinary audio frequency band by the demodulator 10 in the information terminal 2 through the private telephone line 17, and is output from a speaker 12.

On the other hand, in the case of extension service between the information terminal 2 and information terminal 3, the flow of an audio signal sent from information terminal 2 is as follows: the audio signal entered from the microphone 11 is modulated into an audio signal frequency band 19 by the modulator 9, and is demodulated into a telephone signal frequency band 18 in a demodulator 14 of the information terminal 3 through the private telephone line 17, and is output from a speaker 16 of the information terminal 3.

To the contrary, the flow of an audio signal received at information terminal 2 from information terminal 3 is as follows: the audio signal entered from a microphone 15 is modulated into an audio signal frequency band 20 by a modulator 13, and is demodulated into an ordinary audio frequency band 18 by the demodulator 10 in the information terminal 2 through the private telephone line 17, and is output from the speaker 12 of the information terminal 2.

Thus, in the case of an outside call from the information terminal, the audio signal frequency bands 19, 20 in FIG. 23 were used, and also in the case of extension service, the same audio signal frequency bands 19, 20 were used.

However, since the audio signal frequency bands 19, 20 are used both in an outside call from the information terminal and in extension service, if there are two service bands only, that is, audio signal frequency bands 19 and 20 only, while one information terminal is busy with outside call, extension service is not possible in other terminal.

SUMMARY OF THE INVENTION

The invention is devised in the light of the prior art described above, and it is hence an object thereof to present an information terminal capable of using extension service in other information terminal during outside call, realizing a telephone number system integrated according to one concept in telephone network, and easily adding and removing telephone sets.

To achieve the object, the information terminal of the invention comprises a telephone line interface as an extension interface and a network interface, and specifically the invention presents an information terminal and an information terminal system having each information terminal provided with an identification address for recognizing each information terminal, and capable of adding easily by communication with other information terminal by means of the identification address.

BRIEF DESCRIPTION OF THE DRAWINGS

FIG. 21 is a memory unit table composition diagram in embodiment 19 of the invention.

DETAILED DESCRIPTION

Figure 1:
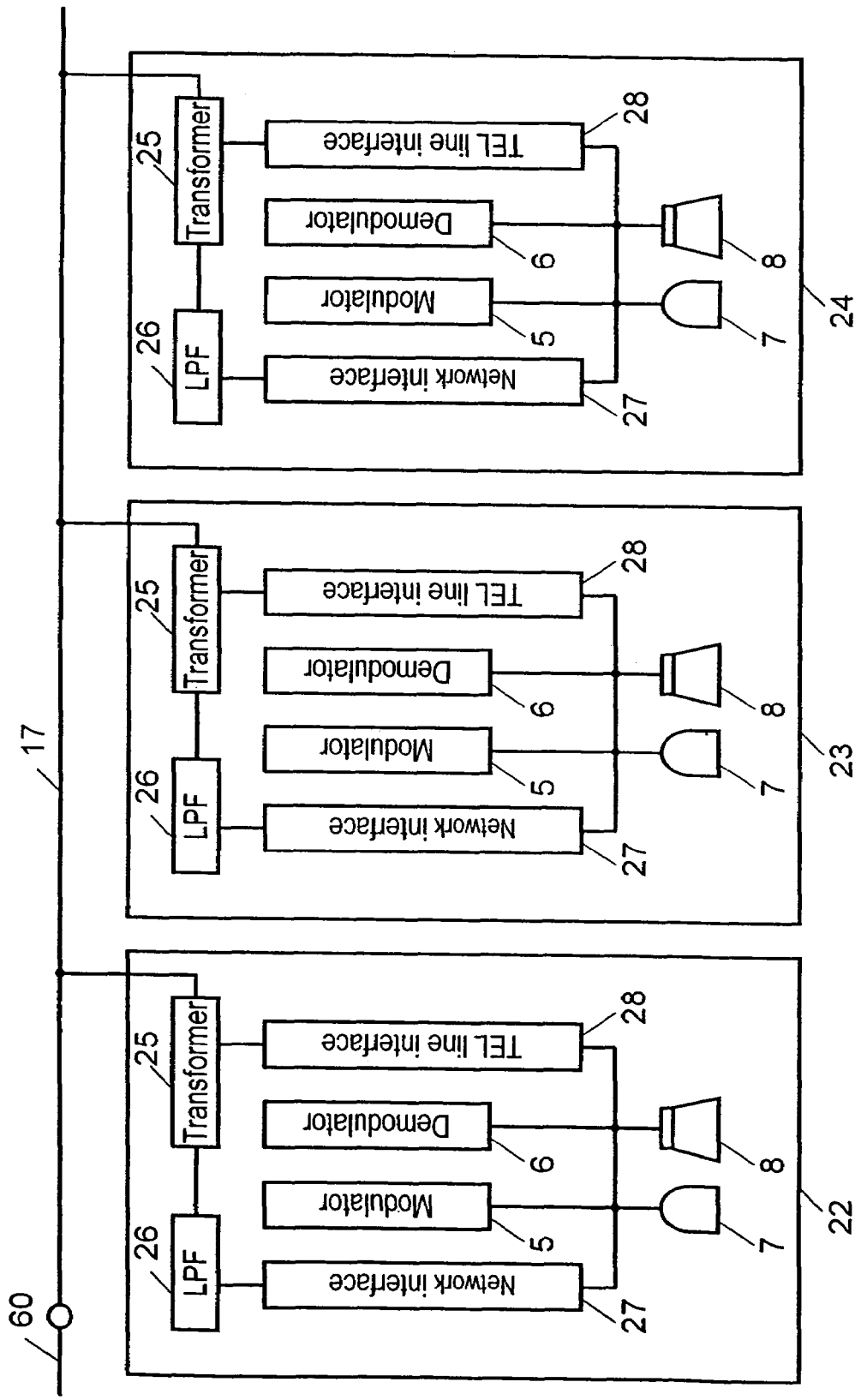
FIG. 1 is a block diagram showing a configuration of information terminal and information terminal system in embodiment 1 of the invention.

The invention is described in detail while referring to the drawings showing preferred embodiments.

Embodiment 1

FIG. 1 is a block diagram showing a configuration of information terminal and information terminal system in embodiment 1 of the invention.

In FIG. 1, plural information terminals are connected to a private telephone line 17, and the private telephone line 17 is connected to the subscriber's line 60 leading to the exchange, so that the plural information terminals 22, 23, 24, . . . are connected parallel to the subscriber's line 60 through the private telephone line 17. In FIG. 1, the same reference numerals as in FIG. 22 relating to the prior art have the same functions.

In the information terminals 22, 23, 24, a transformer 25 sends and receives analog and digital signals to and from the private telephone line 17. A low pass filter (LPF) 26 passes only analog signals. A network interface circuit 27 is a converting circuit for analog telephone. A telephone line interface circuit 28 which is an extension interface is a circuit for sending and receiving packetized digital information through the private telephone line 17 by using Carrier Sense Multiple Access/Collision Detection (CSMA/CD) system which is a system of Ethernet employed in ordinary Local Area Network (LAN).

Figure 2:
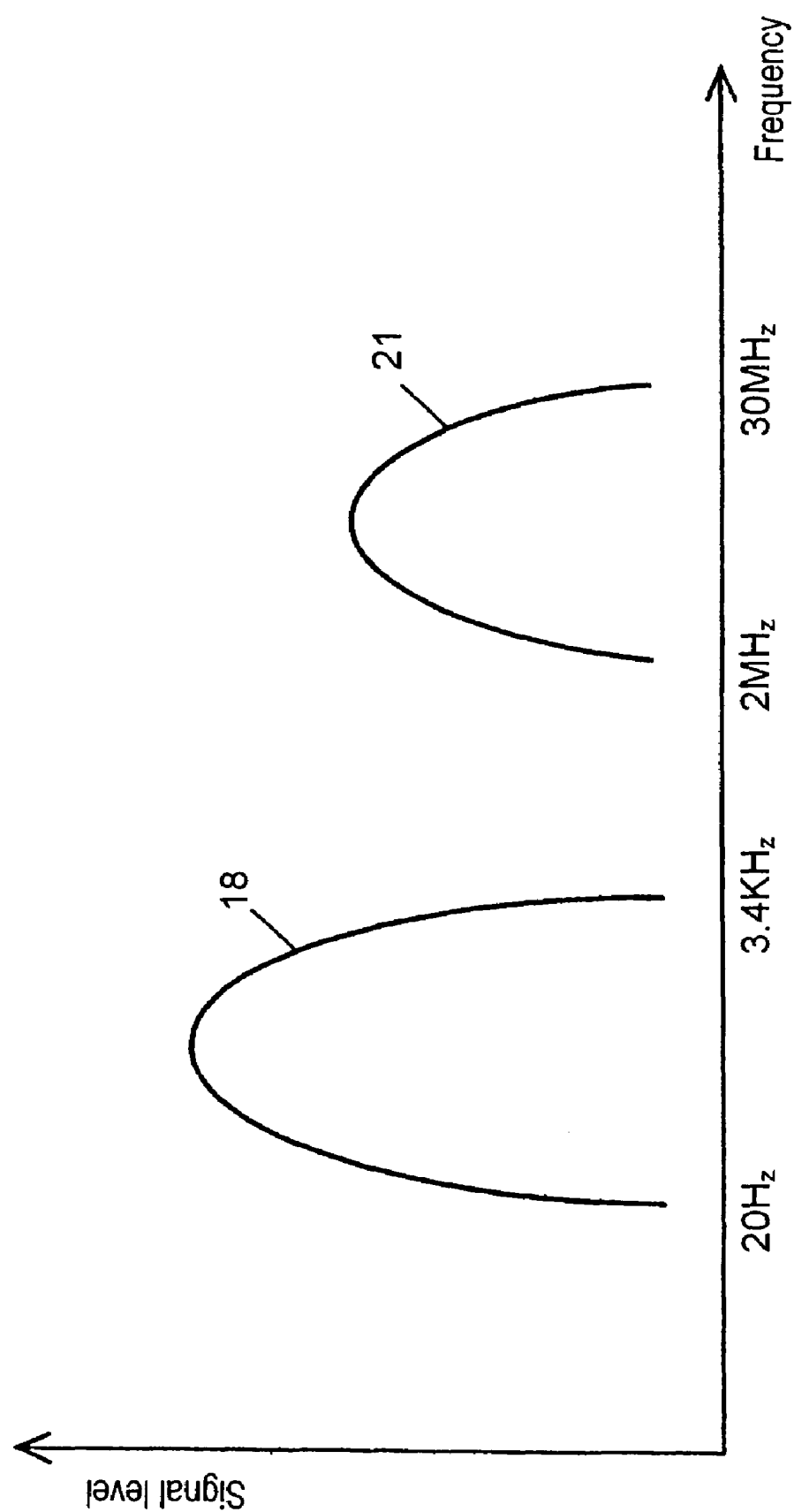
FIG. 2 is a frequency band diagram of information terminal and information terminal system in the invention.

FIG. 2 is a frequency band diagram of the system in the embodiment of the invention. FIG. 2 shows a telephone signal frequency band 18 and, a signal frequency band 21 of packetized digital information signals for sending and receiving through the private telephone line 17 by employing the CSMA/CD system by means of telephone line interface 28.

In the information terminal having such configuration, the operation is explained below.

The flow of an audio signal in the case of outside call sent from the information terminal 22 is as follows.

The audio signal entered from a microphone 7 of the information terminal 22 is modulated into a telephone signal frequency band 18 in FIG. 2 by means of a modulator 5, and is sent to the exchange through the subscriber's line 60 by way of network interface 27, LPF 26, and transformer 25.

To the contrary, an audio signal received at information terminal 22 that is sent from the exchange through the subscriber's line 60 is fed into the transformer 25 and LPF 26, where necessary signal components are taken out, and is demodulated into an ordinary audio frequency band by a demodulator 6 through the network interface 27, and is output from a speaker 8.

On the other hand, in the case of extension service between the information terminal 22 and another information terminal 23 or 24, the flow of an audio signal sent from information terminal 22 is as follows.

The audio signal entered from the microphone 7 of the information terminal 22 is converted into packetized digital signals by the telephone line interface circuit 28, and is further modulated into a data signal frequency band 21, and is transmitted through the private telephone line 17 by way of the transformer 25. At another information terminal 23 or 24, packetized digital signals are demodulated into analog signals in the transformer 25 and telephone line interface circuit 28, and output from the speaker 8.

Thus, according to embodiment 1, in the case of an outside call from the information terminal, the telephone signal frequency band 18 in FIG. 2 is used, and in the case of extension service, the signal frequency band 21 of packetized digital signals is used.

Accordingly, if an outside call and an extension service are used at the same time, since the frequency bands of audio signals are different, no conflict of signals occurs, so that the service is smoothly done.

In the same method, of course, an outside call and extension service are also available from the information terminals 23 and 24. In this embodiment, the LPF 26 is used, but it may be omitted if the signal quality can be assured.

Embodiment 2

Figure 3:
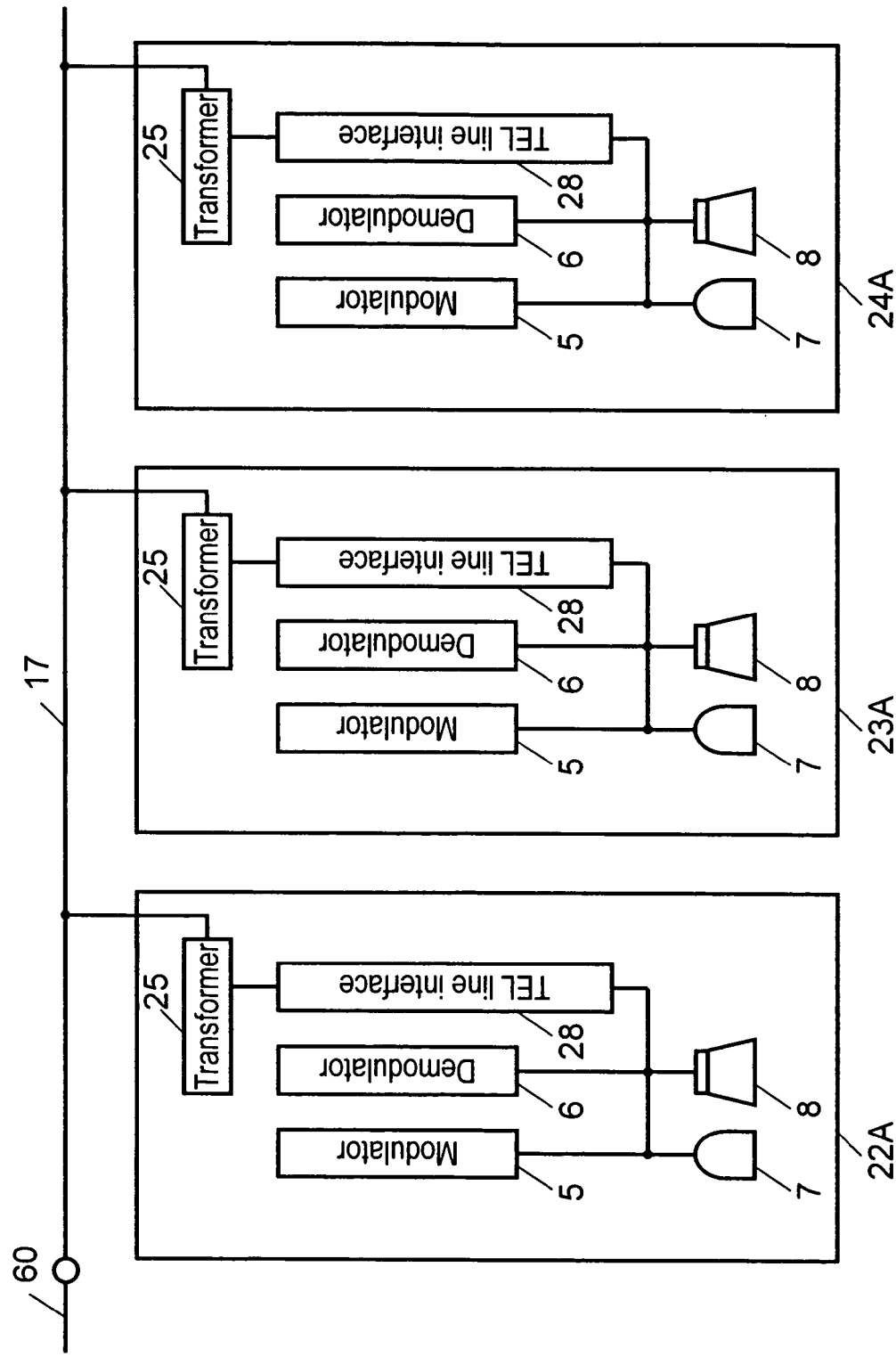
FIG. 3 is a block diagram showing a configuration of information terminal and information terminal system in embodiment 2 of the invention.

FIG. 3 is a block diagram showing a configuration of information terminal and information terminal system in embodiment 2 of the invention.

In FIG. 3, the same reference numerals as in embodiment 1 in FIG. 1 have the same functions. Information terminals 22A, 23A, 24A send and receive digital signals to and from the private telephone line 17 through the transformer 25. The telephone line interface circuit 28 is a circuit for sending and receiving packetized digital information signals through the private telephone line 17 by the CSMA/CD system. In embodiment 2, only the signal frequency band 21 of packetized digital information signals for sending and receiving in FIG. 2 is used, and the outside call is also given by packetized digital data.

In the information terminal having such configuration, the operation is explained below.

The flow of an audio signal in the case of outside call sent from the information terminal 22A is as follows. The audio signal entered from a microphone 7 of the information terminal 22A is converted into a packetized digital signal by a telephone line interface circuit 28, and is further modulated into a signal frequency band 21, and is transmitted through a private telephone line 17 by way of a transformer 25, and is sent to the exchange through the subscriber's line 60. To the contrary, an audio signal received at information terminal 22A that is sent from the exchange through the subscriber's line 60 is fed into the transformer 25 and telephone line interface circuit 28, and packetized digital signals are demodulated into analog signals, and output from a speaker 8.

On the other hand, in the case of extension service between the information terminal 22A and other information terminal 23A or 24A, the flow of an audio signal sent from information terminal 22A is as follows. The audio signal entered from the microphone 7 of the information terminal 22A is converted into packetized digital signals by the telephone line interface circuit 28, and is further modulated into a signal frequency band 21, and is transmitted through the private telephone line 17 by way of the transformer 25.

At other information terminal 23 or 24, packetized digital signals are demodulated into analog signals in the transformer 25 and telephone line interface circuit 28, and output from the speaker 8.

Thus, according to embodiment 2, in the case of outside call and extension service from the information terminal, only the signal frequency band 21 of packetized digital signals is used, and these digital signals are of CSMA/CD system, and practically, as compared with ordinary analog signals, the signal transmission and reception speed is faster by more than two orders of magnitude. Accordingly, if outside call and extension service are used at the same time, the data can be sent and received at high speed, and processing in multiple lines is possible, and speech can be sent and received at high sound quality. The transmission and reception speed (transfer speed) of digital signal is desired to be at least 1 Mbps.

Embodiment 3

Figure 4:
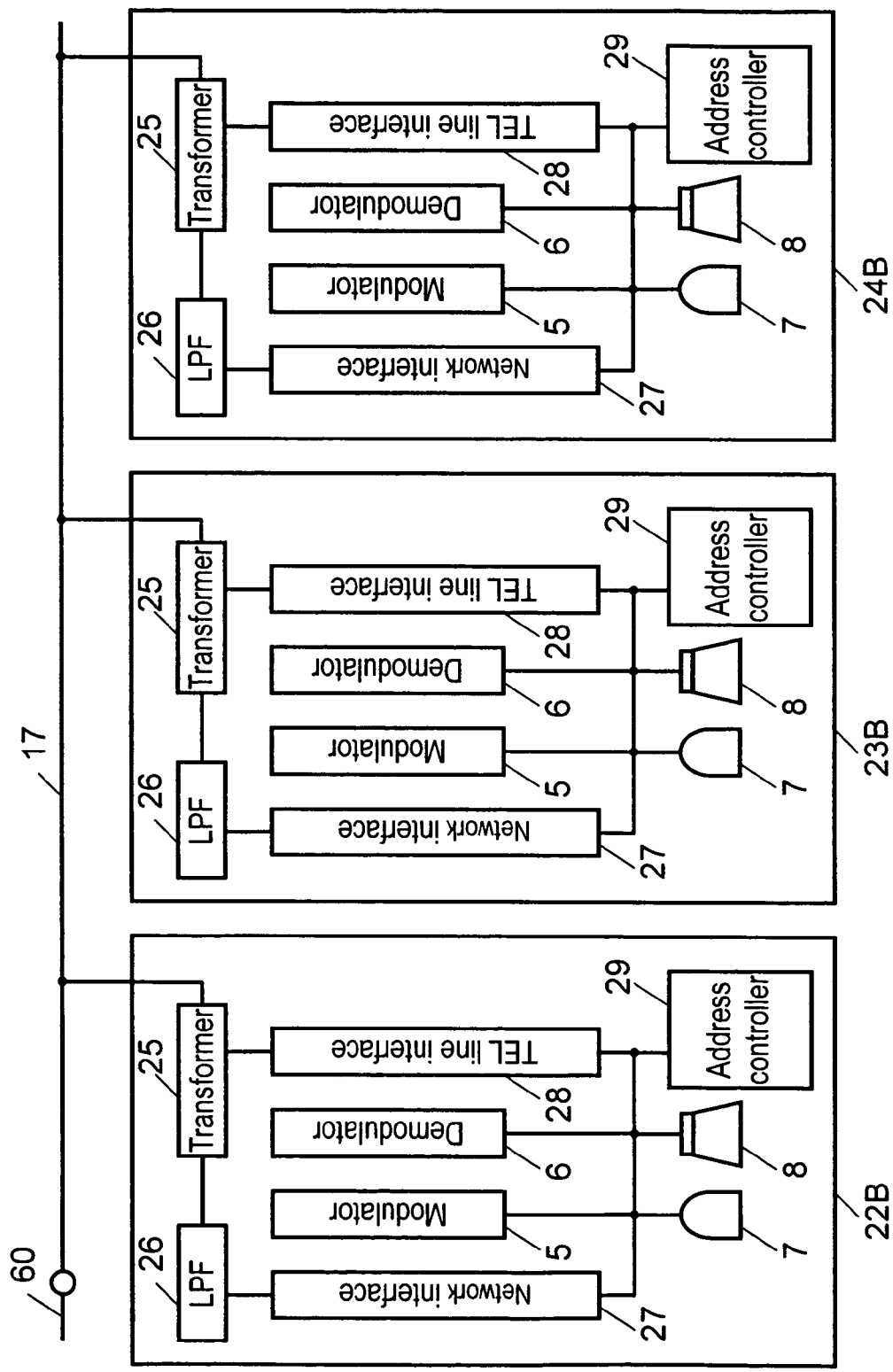
FIG. 4 is a block diagram showing a configuration of information terminal and information terminal system in embodiment 3 of the invention.

FIG. 4 is a block diagram showing a configuration of information terminal and information terminal system in embodiment 3 of the invention. In FIG. 4, the same reference numerals as in embodiment 1 in FIG. 1 have the same functions. An address controller 29 controls the extension service by individual identification addresses of information terminals 22B, 23B, 24B.

Identification addresses may be Media Access Control (MAC) addresses used in ordinary LAN, Internet protocol (IP) addresses, or original addresses. In the information terminals 22B, 23B, 24B, the transformer 25 sends and receives analog and digital signals to and from the private telephone line 17. The LPF 26 passes only analog signals. A network interface circuit 27 is a conversion circuit for analog telephone. A telephone line interface circuit 28 is a circuit for sending and receiving packetized digital information signals to and from the private telephone line 17 by the CSMA/CD system. The system frequency band in embodiment 3 of the invention is as shown in FIG. 2, in which reference numeral 18 is a telephone signal frequency band, and 21 is a signal frequency band of packetized digital information signal for sending and receiving to and from the private telephone line 17 by the CSMA/CD system in the telephone interface circuit 28.

In the information terminal having such configuration, the operation is explained below. The flow of an audio signal in the case of outside call sent from the information terminal 22B is as follows.

The audio signal entered from a microphone 7 of the information terminal 22B is modulated into a telephone signal frequency band 18 of FIG. 2 by the modulator 5, and is sent to the exchange through the subscriber's line 60 by way of the LPF 26 and transformer 25.

To the contrary, an audio signal received at information terminal 22B sent from the exchange through the subscriber's line 60 is fed into the transformer 25 and LPF 26, where necessary signal components are taken out, and is demodulated into an ordinary audio frequency band by the demodulator 6, and output from a speaker 8.

On the other hand, in the case of extension service between the information terminal 22B and information terminal 23B, in order to communicate to the information terminal 23B, the address controller 29 of the information terminal 22B and the telephone line interface 28 modulate the identification address signal of the information terminal 23B into signal frequency band 21, and transmit through the private telephone line 17 by way of the transformer 25. In the information terminal 23B, by the transformer 25 and telephone line interface circuit 28, the identification address signal is received. When the identification address is recognized to be addressed to its own address, the data is received. Similarly, when sending a reply to the partner, by giving the partner's identification address, mutual communication is realized The communications are made in the same way, when communicating between 22B and 24B, and between 23B and 24B.

Thus, according to embodiment 3, in the case of extension service, it is possible to send and receive securely and easily with a specified partner by using the identification address. If the number of terminals is increased or decreased, by exchange of initial data, increased or decreased identification addresses are stored in individual information terminals, so that it is possible to react easily as the system.

Embodiment 4

Figure 5:
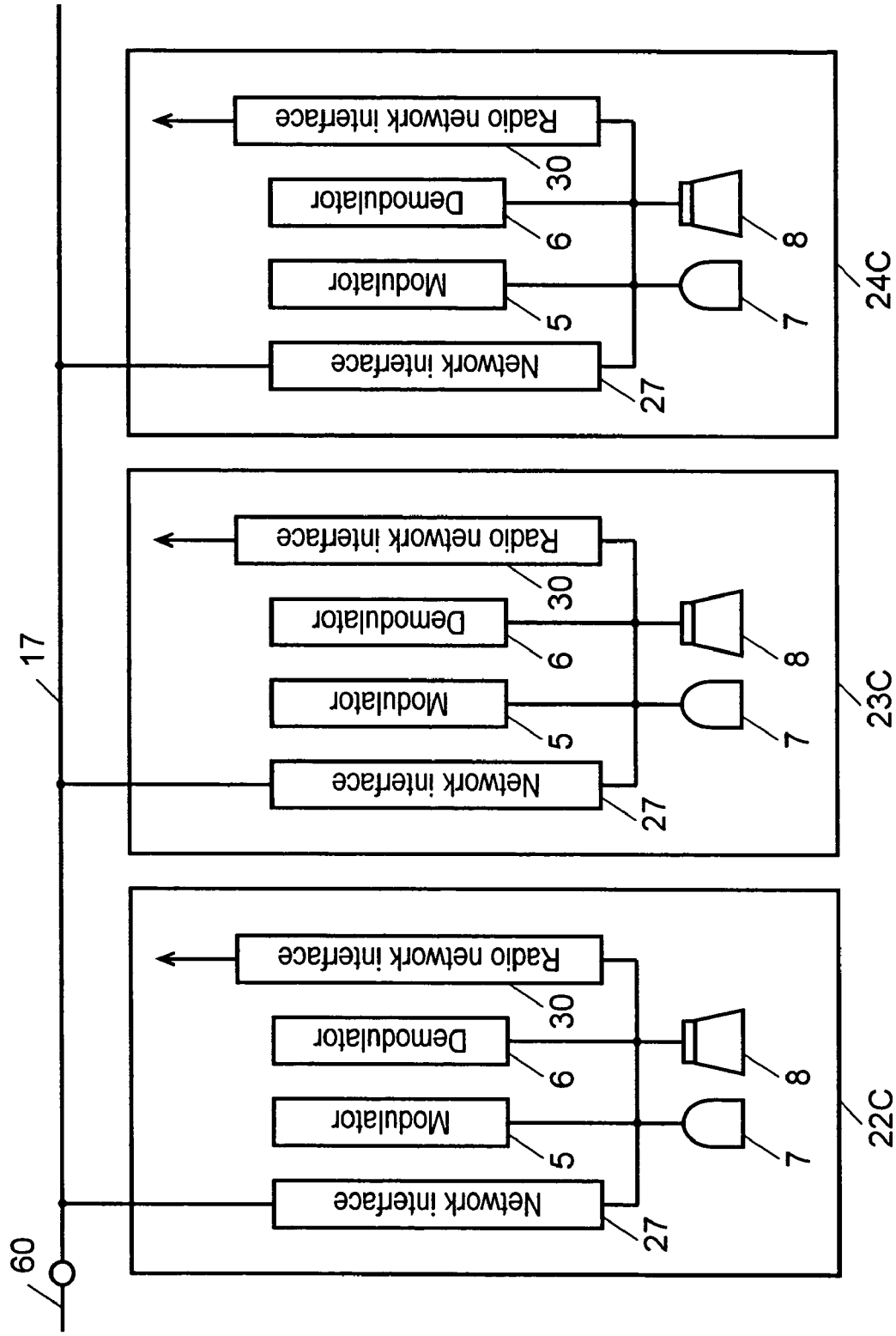
FIG. 5 is a block diagram showing a configuration of information terminal and information terminal system in embodiment 4 of the invention.

FIG. 5 is a block diagram showing a configuration of information terminal and information terminal system in embodiment 4 of the invention. In FIG. 5, the same reference numerals as in embodiment 1 in FIG. 1 have the same functions.

In information terminals 22C, 23C, 24C, a network interface circuit 27 is a conversion circuit for analog telephone. A radio network interface 30 is a circuit for sending and receiving packetized digital information by radio wave.

In the information terminal having such a configuration, the operation is explained below.

The flow of an audio signal in the case of outside call sent from the information terminal 22C is as follows. The audio signal entered from a microphone 7 of the information terminal 22C is modulated by the modulator 5, and is sent to the exchange through the subscriber's line 60 by way of the private telephone line 17. To the contrary, an audio signal received at information terminal 22C that is sent from the exchange through the subscriber's line 60 is fed into the demodulator 6 to be demodulated into ordinary audio frequency band, and output from a speaker 8.

On the other hand, in the case of extension service between the information terminal 22C and other information terminal 23C or 24C, at the information terminal 22C, the audio signal entered from the microphone 7 is converted into a packetized digital signal by the radio network interface 30, and is transmitted by radio wave. At another information terminal 23C or 24C, the packetized digital signal is demodulated into an analog signal by the radio network interface 30, and is output from the speaker 8.

In the case of an outside call from the information terminal 23C or 24C, through each radio network interface 30, an outside call is possible through the network interface 27 of the information terminal 22C.

Thus, according to embodiment 4, the telephone signal frequency band 18 in FIG. 2 is used for an outside call from the information terminal and the packetized digital signal is transmitted by radio wave in the case of extension service. Radio transmission of packetized digital signal is fast in transfer speed, and multiple lines can be processed, so that the speech can be exchanged smoothly, without any conflict of signals, when an outside call and extension service is used at the same time.

According to the connection in FIG. 5, the outside call from the information terminal 23C or 24C is made through the radio network interface 30, but when the network interface 27 of the information terminal 23C or 24C is connected to the private telephone line 17, outside call is possible directly. Further, if the information terminal 22C is used as an exclusive outside call, the network interface 27 of the information terminal 23C or 24C may be omitted.

Embodiment 5

Figure 6:
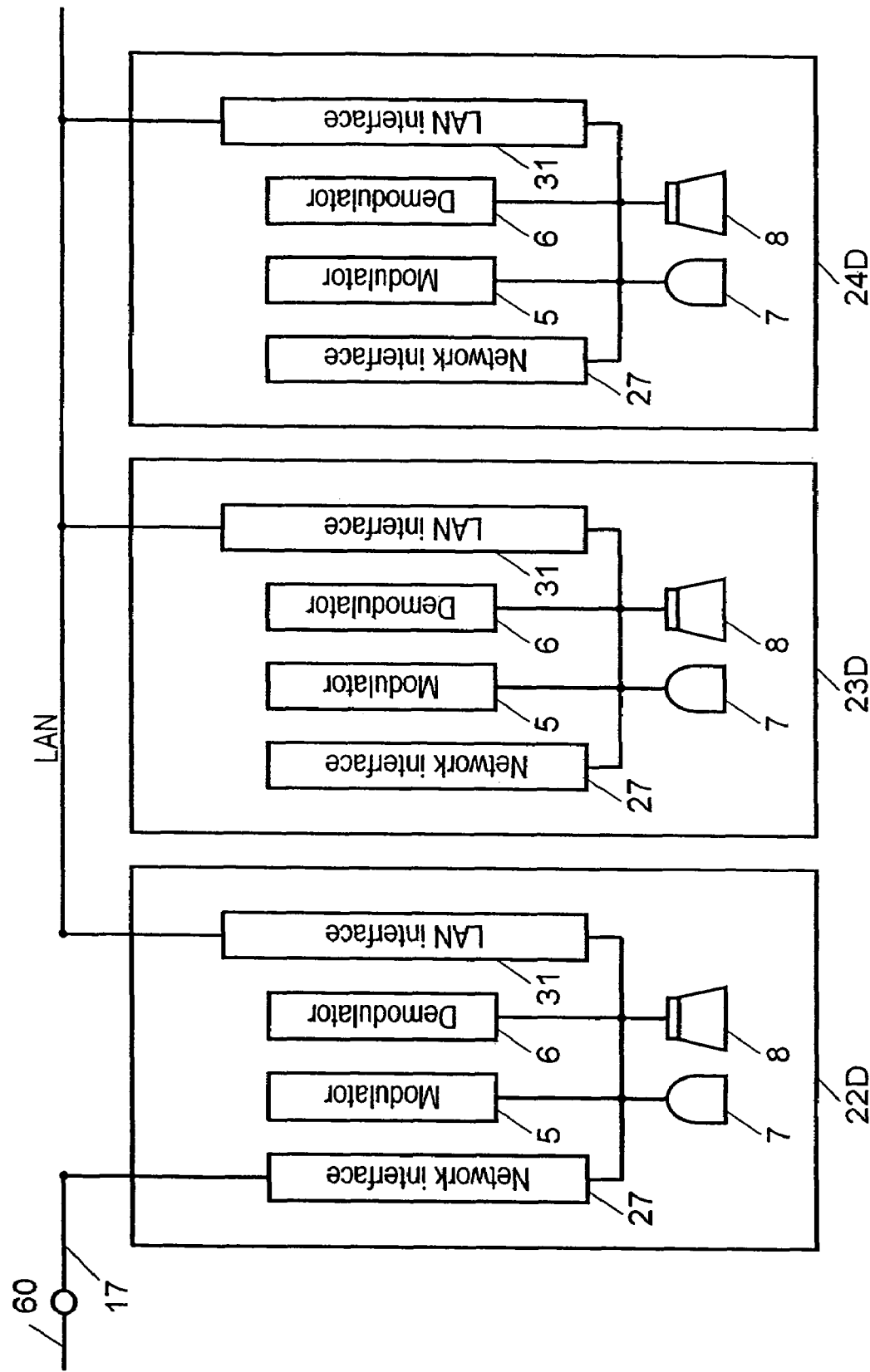
FIG. 6 is a block diagram showing a configuration of information terminal and information terminal system in embodiment 5 of the invention.

FIG. 6 is a block diagram showing a configuration of information terminal and information terminal system in embodiment 5 of the invention. In FIG. 6, the same reference numerals as in embodiment 1 in FIG. 1 have the same functions.

In information terminals 22D, 23D, 24D, a network interface circuit 27 is a conversion circuit for analog telephone. A LAN interface circuit 31 is a circuit for sending and receiving packetized digital information by CSMA/CD system which is a method of Ethernet.

In the information terminal having such configuration, the operation is explained below.

The flow of an audio signal in the case of outside call sent from the information terminal 22D is as follows.

The audio signal entered from a microphone 7 of the information terminal 22D is modulated by the modulator 5, and is sent to the exchange through the subscriber's line 60 by way of the private telephone line 17.

To the contrary, an audio signal received at information terminal 22D sent from the exchange through the subscriber's line 60 is fed into the demodulator 6 to be demodulated into ordinary audio frequency band, and output from a speaker 8.

On the other hand, in the case of extension service between the information terminal 22D and another information terminal 23D or 24D, the flow of an audio signal sent from information terminal 22D is as follows.

The audio signal entered from the microphone 7 of the information terminal 22D is converted into a packetized digital signal by the LAN interface circuit 31, and is transmitted through the LAN network. At other information terminal 23D or 24D, the packetized digital signal is demodulated into an analog signal by the LAN interface 31, and is output from the speaker 8.

In the case of outside call from the information terminal 23D or 24D, through the LAN interface circuit 31 of each information terminal, LAN network, and LAN interface circuit 31 of the information terminal 22D, outside call is possible through the network interface 27 of the information terminal 22D.

Thus, according to embodiment 5, the telephone signal frequency band 18 in FIG. 2 is used for an outside call from the information terminal 22D, and the LAN interface of packetized digital signal is used in the case of extension service. As compared with the ordinary analog signal, the sending and receiving speed of packetized digital signal is faster by more than two orders of magnitude, and multiple lines can be processed simultaneously, and therefore if outside call and extension service are used at the same time, speeches can be exchanged smoothly without conflict of signals, and practically the sending and receiving speed (transfer speed) is preferred to be 10 Mbps or more.

According to FIG. 6, the outside call from the information terminal 23D or 24D is made by connecting to the LAN interface circuit 31 of the information terminals 22D, 23D, 24D, and the LAN network, but when the network interface 27 of the information terminal 23D or 24D is connected to the private telephone line 17, outside call is possible directly. Further, if the information terminal 22D is used as an exclusive outside call interface, the network interface 27 of the information terminal 23D or 24D may be omitted.

Embodiment 6

Figure 7:
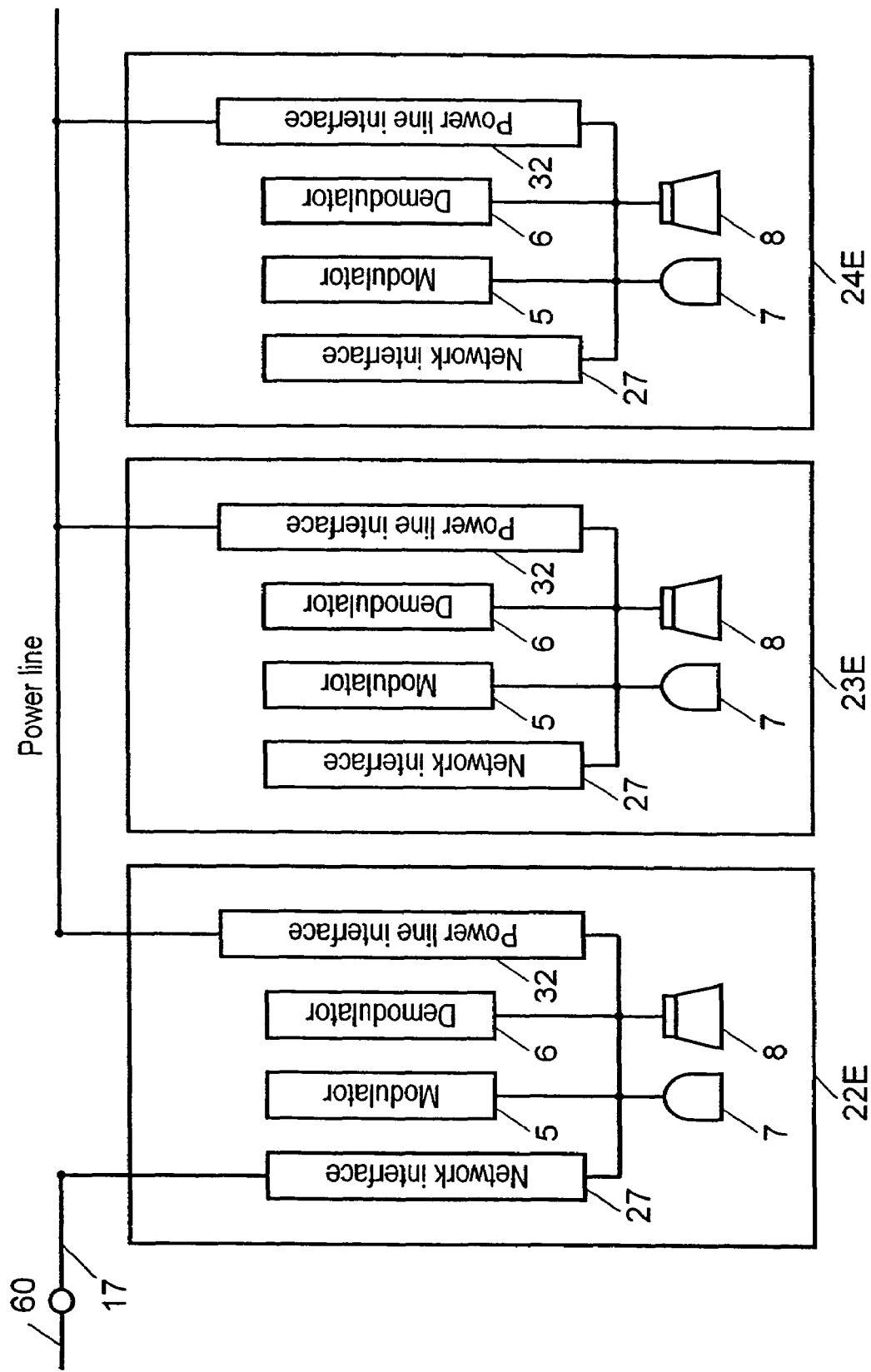
FIG. 7 is a block diagram showing a configuration of information terminal and information terminal system in embodiment 6 of the invention.

FIG. 7 is a block diagram showing a configuration of information terminal and information terminal system in embodiment 6 of the invention. In FIG. 7, the same reference numerals as in embodiment 1 in FIG. 1 have the same functions.

In information terminals 22E, 23E, 24E, a network interface circuit 27 is a conversion circuit for analog telephone. A power line interface circuit 32 is a circuit for sending and receiving packetized digital information by using a power line.

In the information terminal having such configuration, the operation is explained below.

The flow of an audio signal in the case of outside call sent from the information terminal 22E is as follows. The audio signal entered from a microphone 7 of the information terminal 22E is modulated by the modulator 5, and is sent to the exchange through the subscriber's line 60 by way of the private telephone line 17.

To the contrary, an audio signal received at information terminal 22E that is sent from the exchange through the subscriber's line 60 is fed into the demodulator 6 to be demodulated into ordinary audio frequency band, and output from a speaker 8.

On the other hand, in the case of extension service between the information terminal 22E and other information terminal 23E or 24E, the flow of an audio signal sent from information terminal 22E is as follows. The audio signal entered from the microphone 7 of the information terminal 22E is converted into a packetized digital signal by the power line interface circuit 32, and is transmitted through the power line 60 to another information terminal 23E or 24E, the received signal is demodulated from the packetized digital signal into an analog signal by the power line interface circuit 32, and is output from the speaker 8.

In the case of an outside call from the information terminal 23E or 24E, through the power line interface circuit 32, an outside call is possible through the network interface 27 of the information terminal 22E.

Thus, according to embodiment 6, the telephone signal frequency band 18 in FIG. 2 is used for outside call from the information terminal 22E, and the power line interface of packetized digital signal is used in the case of extension service. As compared with the ordinary analog signal, the sending and receiving speed of packetized digital signal is faster by more than two orders of magnitude, and multiple lines can be processed simultaneously, and therefore if outside call and extension service are used at the same time, speech can be exchanged smoothly without conflict of signals.

According to FIG. 7, the outside call from the information terminal 23E or 24E is made by connecting to the power line interface circuit 32, but when the network interface 27 of the information terminals 23E and 24E is connected to the private telephone line 17, outside call is possible directly. Further, if the information terminal 22E is used as an exclusive outside call, the network interface of the information terminals 23E and 24E may be omitted.

Moreover, as required, an address controller 29 may be incorporated into the system.

Embodiment 7

Embodiment 7 of the invention is explained below.

Figure 8:
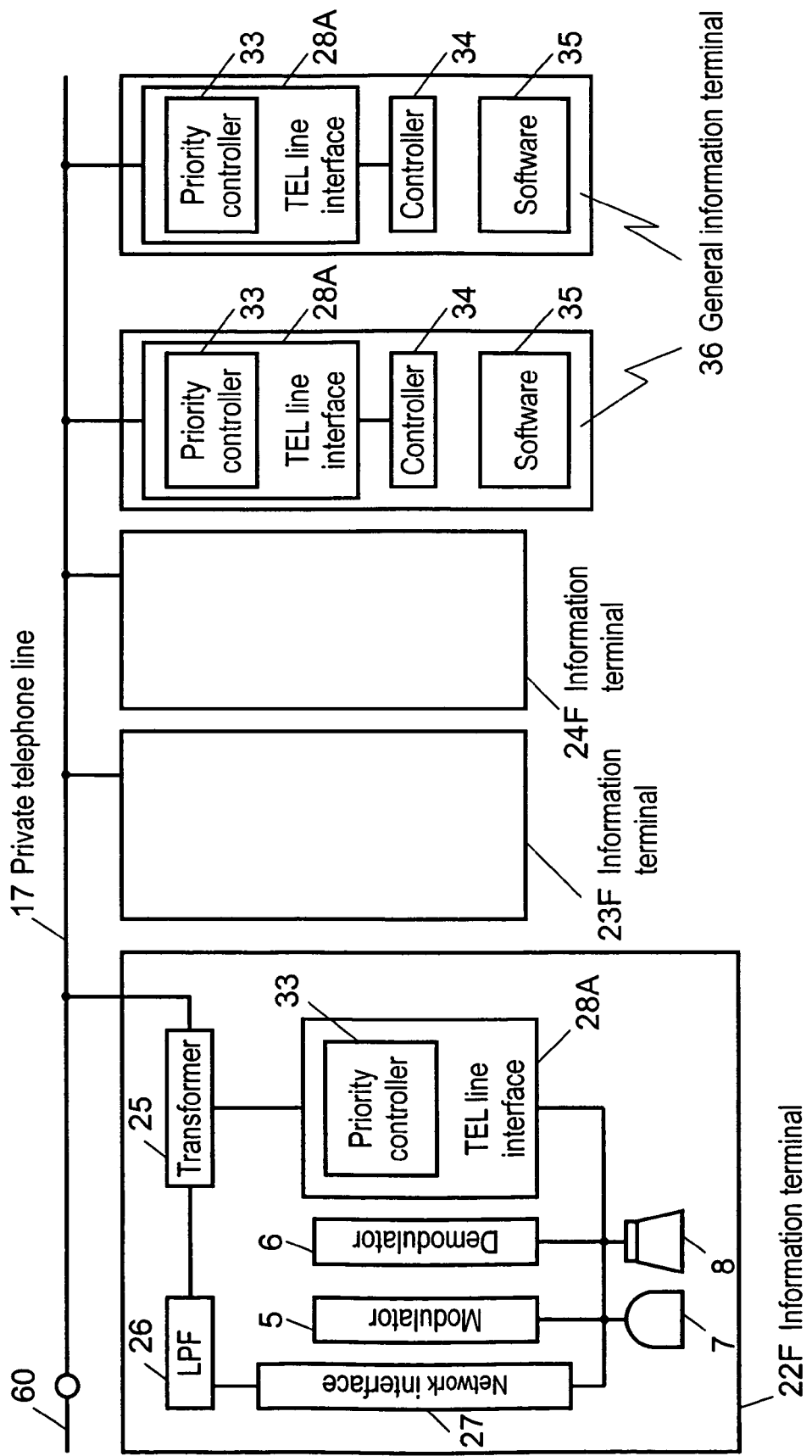
FIG. 8 is a block diagram showing a configuration of information terminal and information terminal system in embodiment 7 of the invention.

FIG. 8 is a block diagram showing a configuration of information terminal and information terminal system in embodiment 7 of the invention.

In FIG. 8, plural information terminals are connected to the private telephone line 17. The private telephone line 17 is connected to the subscriber's line 60 which is linked to the exchange. Plural information terminals 22F, 23F, 24F, and a general information terminal 36 are connected parallel to the subscriber's line 60 through the private telephone line 17.

Figure 22:
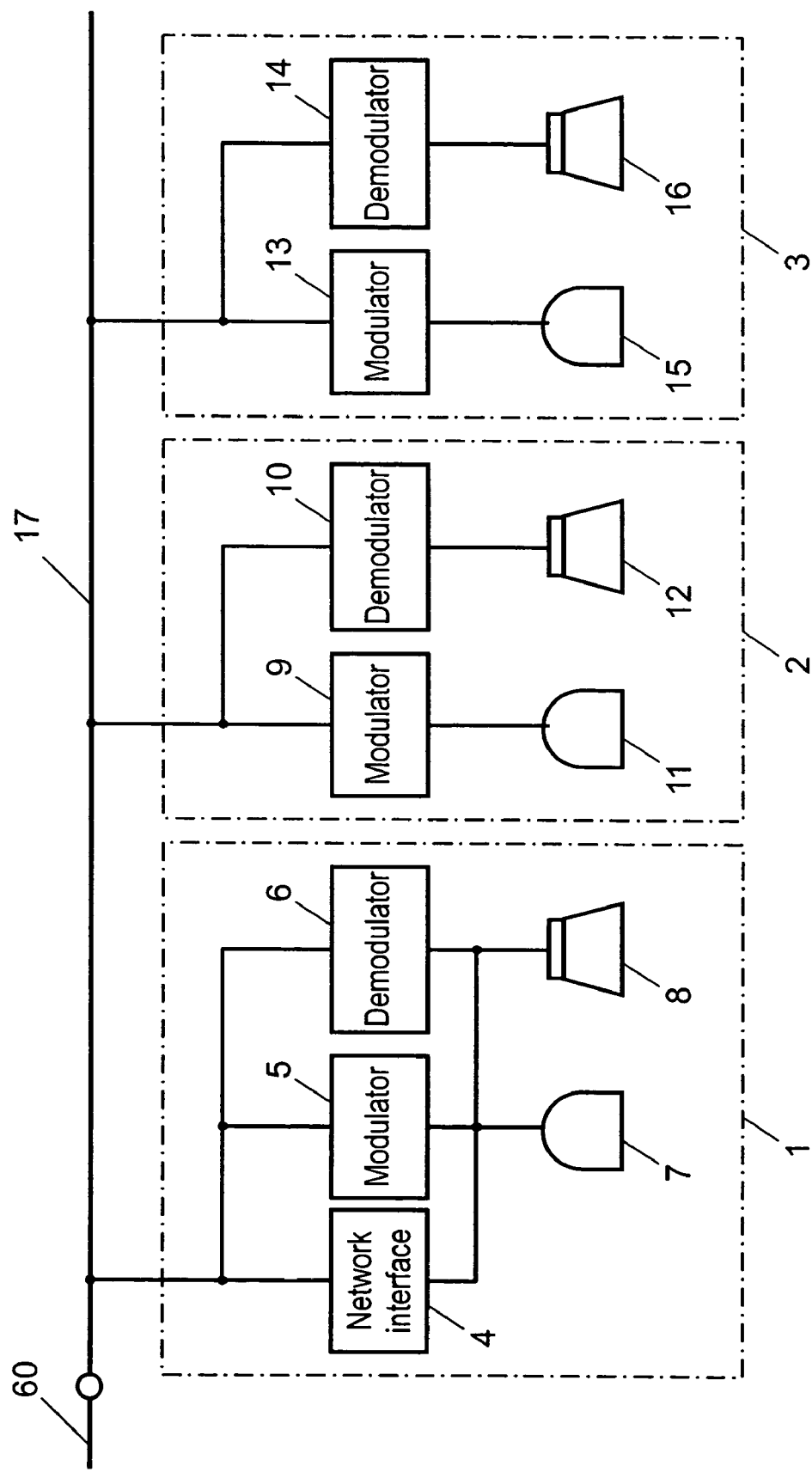
FIG. 22 is a block diagram of a conventional extension telephone system.
Figure 23:
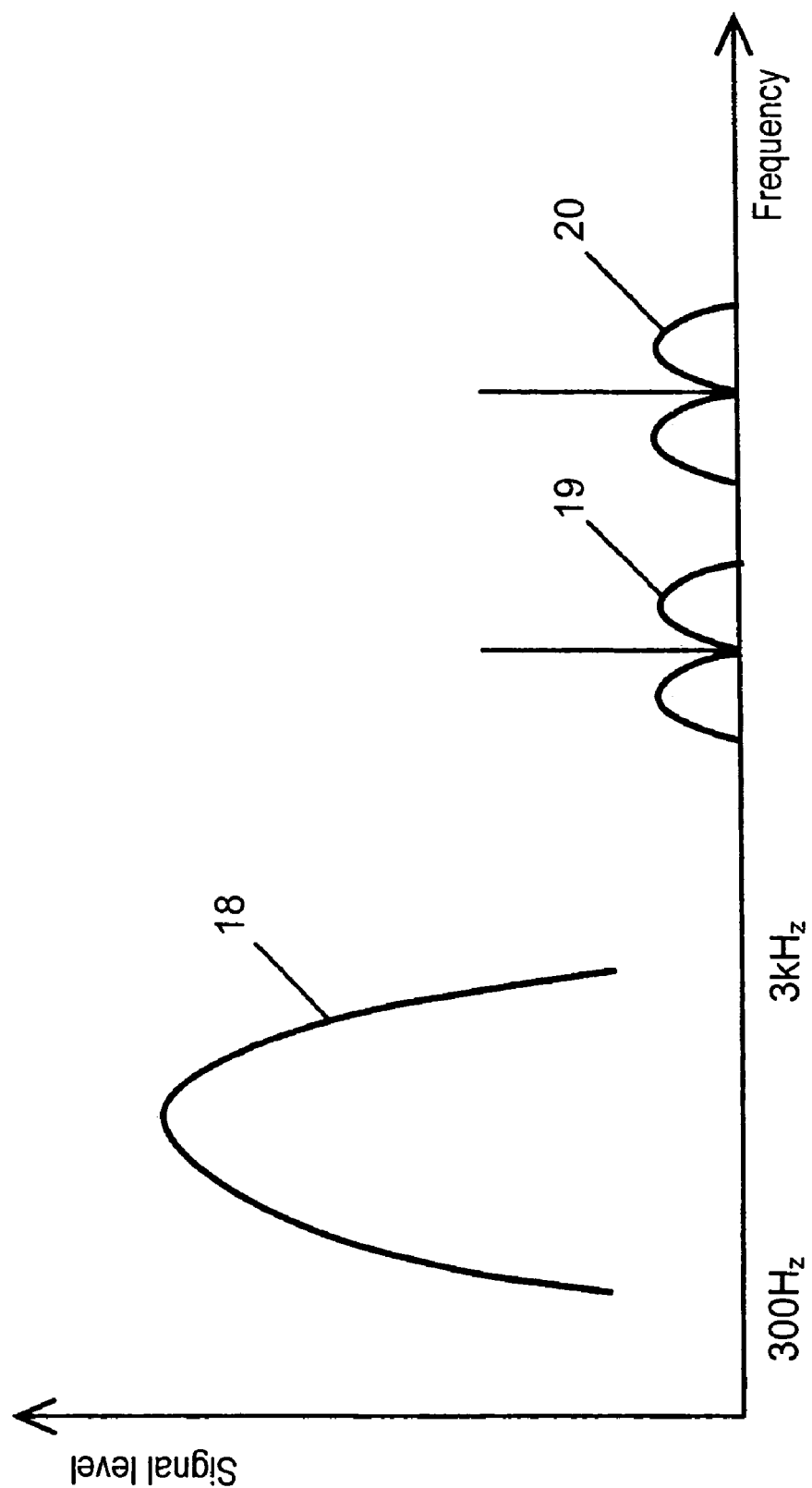
FIG. 23 is a frequency band diagram for audio signal of the conventional extension telephone system.

In FIG. 8, the same reference numerals as in FIG. 22 expressing the prior art have the same functions.

In the information terminals 22F, 23F, 24F, a transformer 25 sends and receives analog and digital signals to and from the private telephone line 17. An LPF 26 passes analog signals only. A network interface 27 is a conversion circuit for analog telephone.

A telephone line interface 28A is an extension interface, that is, a circuit for sending and receiving a packetized digital information signal through the private telephone line 17 according to the CSMA/CD system.

The general information terminal 36 includes a telephone line interface 28A, the same as the telephone line interface in the information terminals 22F, 23F, 24F, a controller 34 for controlling the general information terminal, and software 35 mounted on the general information terminal.

In the information terminals 22F, 23F, 24F, and the general information terminal 36, a priority controller 33 controls the priority among all information terminals connected to the private telephone line 17, thereby allowing only the information terminal gaining the transmission right to send out the digital information issued from the telephone line interface 28A or controller 34 to the private telephone line 17.

In the information terminal having such a configuration, the operation is explained below.

The flow of an audio signal in the case of outside call sent from the information terminal 22F is as follows.

The audio signal entered from a microphone 7 of the information terminal 22F is modulated into a telephone signal frequency 18 in FIG. 2 by the modulator 5, and is sent to the exchange through the subscriber's line 60 by way of the LFP 26 and transformer 25.

To the contrary, an audio signal received at information terminal 22F that is sent from the exchange through the subscriber's line 60 is fed into the transformer 25 and LPF 26 where necessary signal components are taken out, and is further sent into the demodulator 6 to be demodulated into ordinary audio frequency band, and output from a speaker 8.

On the other hand, in the case of extension service between the information terminal 22F and information terminal 23F or 24F, the flow of an audio signal sent from information terminal 22F is as follows. The audio signal entered from the microphone 7 of the information terminal 22F is converted into a packetized digital signal by the telephone line interface 28A.

After completion of preparation of transmission data, the priority controller 33 controls the priority among all of the information terminals 22F, 23F, 24F, and 36 connected to the private telephone line 17.

When the information terminal 22F gains the transmission right, in the information terminal 22F, the packetized digital signal is modulated by the telephone line interface 28A further into a digital signal frequency band 21, and is transmitted through the private telephone line 17 by way of the transformer 25. At another information terminal 23F or 24F, the packetized digital signal is demodulated by the transformer 25 and telephone line interface 28A into an analog signal and is output from the speaker 8.

Thus, according to embodiment 7, the telephone signal frequency band 18 in FIG. 2 is used for outside call from the information terminal, and the signal frequency band 21 of packetized digital signal is used in the case of extension service. Accordingly, if outside call and extension service are used at the same time, since the frequency bands of audio signals are different, no conflict of signals occurs, so that the service is smoothly done. In the same method, of course, outside call and extension service is also available from the information terminals 23F and 24F. In this embodiment, the LPF 26 is used, but it may be omitted if the signal quality can be assured.

Further, by the priority controller 33, by controlling the priority among all of the information terminals 22F, 23F, 24F, and 36 connected to the private telephone line 17, in particular, the real time data such as sound that is demanded to be minimized in the transfer delay time can be transferred by priority over other information terminals. Therefore, in the system including the general information terminal 36 handling other data than the sound, high quality transmission with less delay in sound can be realized.

Embodiment 8

Figure 9:
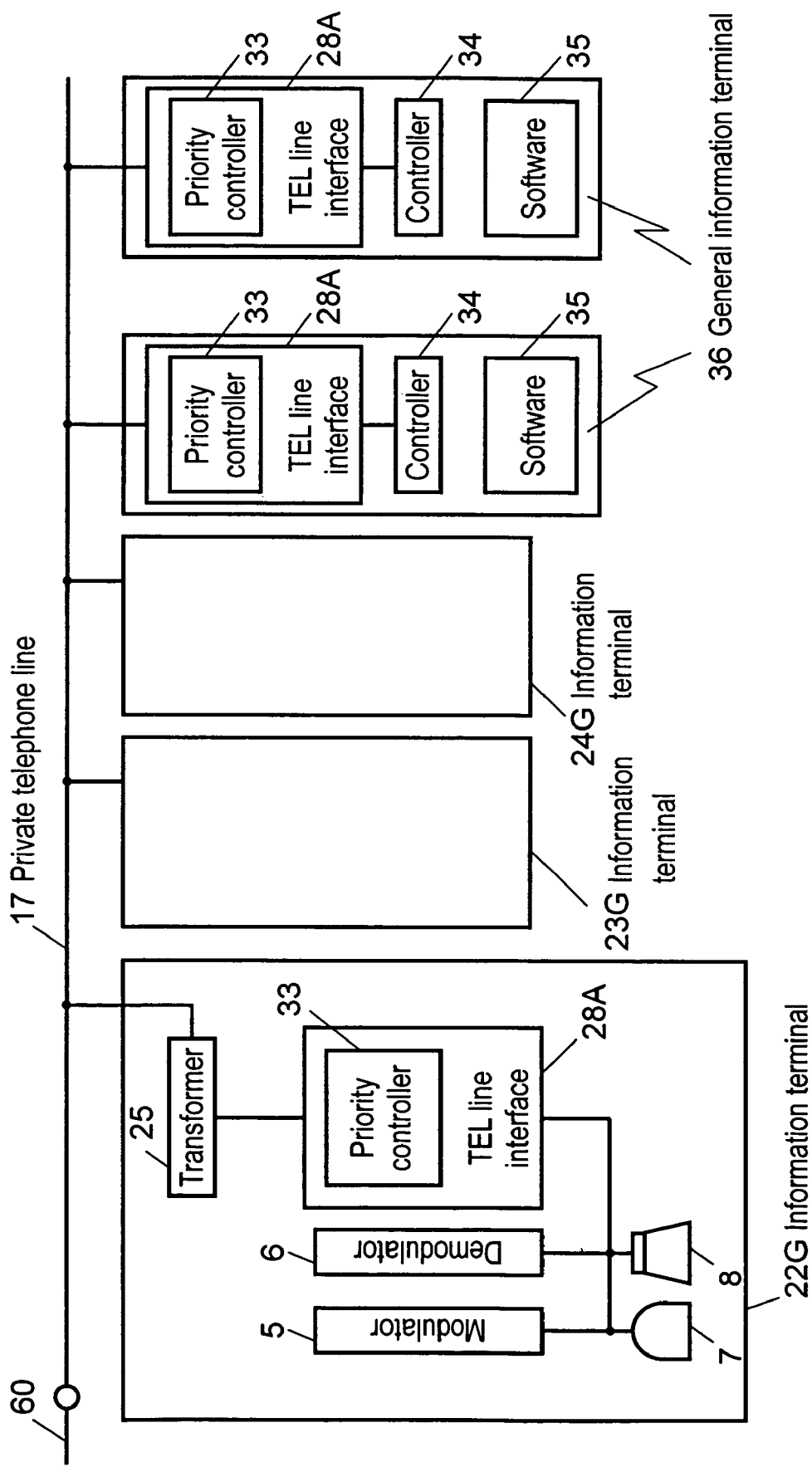
FIG. 9 is a block diagram showing a configuration of information terminal and information terminal system in embodiment 8 of the invention.

FIG. 9 is a block diagram showing a configuration of information terminal and information terminal system in embodiment 8 of the invention.

In FIG. 9, the same reference numerals as in embodiment 7 in FIG. 8 have the same functions.

Information terminals 22G, 23G, 24G are identical in structure, and are designed to send and receive analog and digital signals to and from the private telephone line 17 through the transformer 25. A telephone line interface 28A is a circuit for sending and receiving packetized digital information through the private telephone line 17 according to the CSMA/CD system.

Incidentally, embodiment 8 uses only the signal frequency band 21 of sending and receiving data of packetized digital information signal in FIG. 2.

A general information terminal 36 includes a telephone line interface 28A, the same as the telephone line interface 28A in the information terminals 22G, 23G, 24G, a controller 34 for controlling the general information terminal, and software 35 mounted on the general information terminal.

In the information terminals 22G, 23G, 24G, and the general information terminal 36, a priority controller 33 controls the priority among all information terminals connected to the private telephone line 17, thereby allowing only the information terminal gaining the transmission right to send out the digital information issued from the telephone line interface 28A or controller 34 to the private telephone line 17.

In the information terminal having such configuration, the operation is explained below.

The flow of an audio signal in the case of an outside call sent from the information terminal 22G is as follows.

The audio signal entered from a microphone 7 of the information terminal 22G is modulated into a packetized digital signal by the telephone line interface 28A, and is further modulated into a digital signal frequency band 21, and is sent to the exchange through the subscriber's line 60 by way of the transformer 25 and private telephone line 17.

To the contrary, an audio signal received at information terminal 22G that is sent from the exchange through the subscriber's line 60 is fed into the transformer 25 and telephone line interface 28A where packetized digital signal is demodulated into an analog signal, and output from a speaker 8.

On the other hand, in the case of extension service between the information terminal 22G and other information terminal 23G or 24G, the flow of audio signal sent from information terminal 22G is as follows.

The audio signal entered from the microphone 7 of the information terminal 22G is converted into a packetized digital signal by the telephone line interface 28A, and is further modulated into a signal frequency band 21, and is transmitted through the transformer 25 and private telephone line 17.

At other information terminal 23G or 24G, the packetized digital signal is demodulated by the transformer 25 and telephone line interface 28A into an analog signal, and is output from the speaker 8.

Thus, according to embodiment 8, the signal frequency band 21 of packetized digital signal is used in both the outside call and the extension service from the information terminal. However, in the CSMA/CD system, the signal sending and receiving speed is high, and it is more than two orders of magnitude faster than ordinary analog signals Therefore when both an outside call and an extension service are used at the same time, data can be sent and received much faster than analog audio signals, and multiple lines can be processed simultaneously, so that the speech can be exchanged while maintaining the sound quality.

Further, by the priority controller 33, by controlling the priority among all of the information terminals 22G, 23G, 24G, and 36 connected to the private telephone line 17, in particular, the real time data such as sound that is demanded to be minimized in the transfer delay time can be transferred by priority over other information terminals. Therefore, in the system including the general information terminal 36 handling other data than the sound, high quality transmission with less delay in sound can be realized.

Embodiment 9

Figure 10:
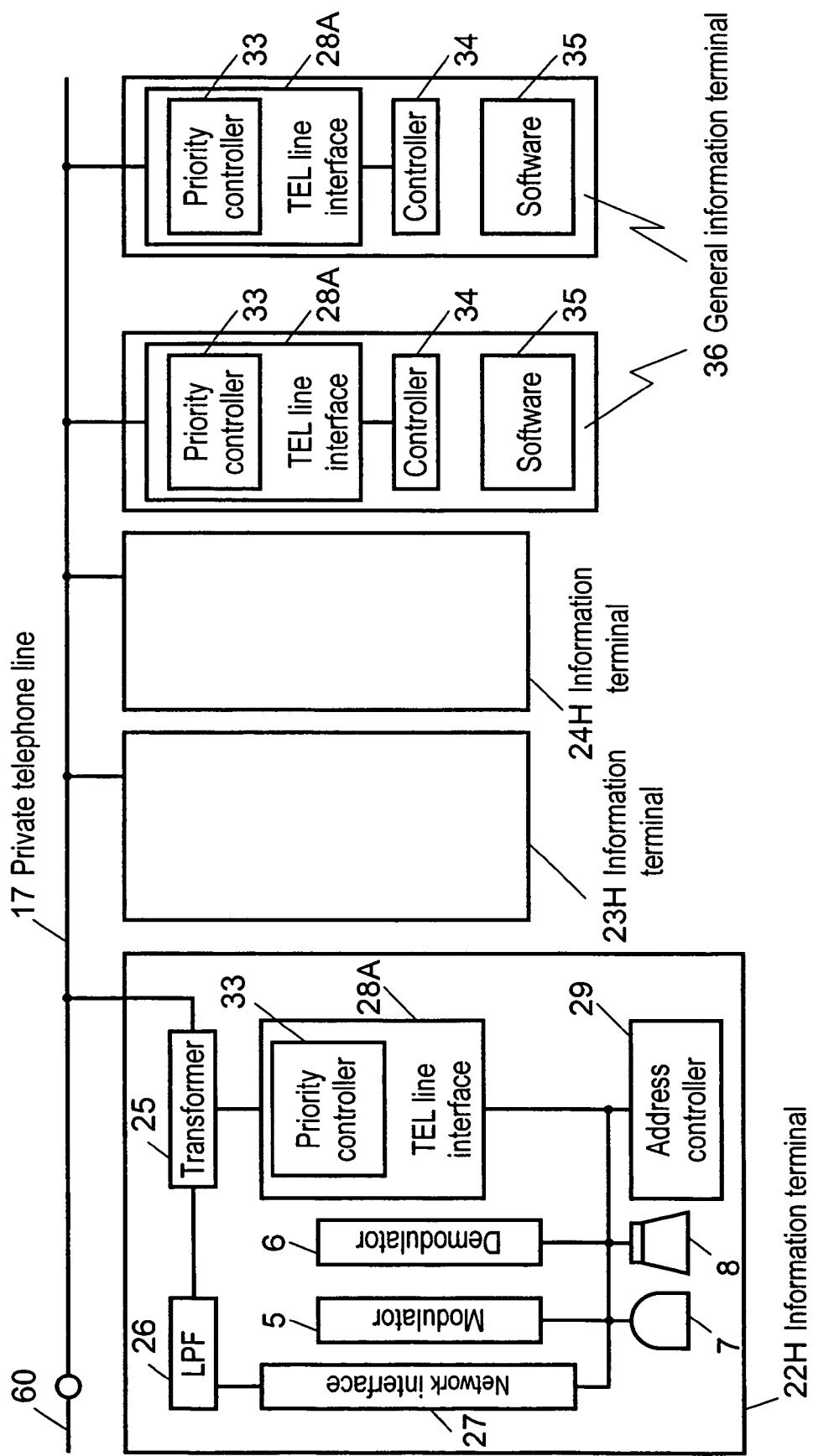
FIG. 10 is a block diagram showing a configuration of information terminal and information terminal system in embodiment 9 of the invention.

FIG. 10 is a block diagram showing a configuration of information terminal and information terminal system in embodiment 9 of the invention.

In FIG. 10, the same reference numerals as in embodiment 7 in FIG. 8 have the same functions.

An address controller 29 controls the extension service by the individual identification addressees of information terminals 22H, 23H, 24H. Identification addresses may be Media Access Control (MAC) addresses used in ordinary LAN, Internet protocol (IP) addresses, or original addresses.

In the information terminals 22H, 23H, 24H, a transformer 25 sends and receives analog and digital signals to and from the private telephone line 17. An LPF 26 passes only analog signals. A network interface 27 is a conversion circuit for an analog telephone. A telephone line interface 28A is a circuit for sending and receiving packetized digital information to and from the private telephone line 17 by the CSMA/CD system.

In a general information terminal 36, a telephone line interface 28A is the same as 28A in the information terminals 22H, 23H, 24H, a controller 34 controls the general information terminal, and software 35 is mounted on the general information terminal.

In the information terminals 22H, 23H, 24H, and the general information terminal 36, a priority controller 33 controls the priority among all information terminals connected to the private telephone line 17, thereby allowing only the information terminal gaining the transmission right to send out the digital information issued from the telephone line interface 28A or controller 34 to the private telephone line 17.

The system frequency band of the invention is shown in FIG. 2. A signal frequency band 18 is for an ordinary telephone, and a signal frequency band of digital signal 21 is for sending and receiving packetized digital information signal through the private telephone line 17 by the CSMA/CD system.

In the information terminal having such a configuration, the operation is explained below.

The flow of an audio signal in the case of an outside call sent from the information terminal 22H is as follows.

The audio signal entered from a microphone 7 of the information terminal 22H is modulated into a telephone signal frequency band 18 in FIG. 2 by the modulator 5, and is sent to the exchange through the subscriber's line 60 by way of the LPF 26 and transformer 25.

To the contrary, an audio signal received at information terminal 22H that is sent from the exchange through the subscriber's line 60 is fed into the transformer 25 and LPF 26, where necessary signal components are taken out, and is demodulated into an ordinary audio frequency band by the demodulator 6, and output from a speaker 8.

On the other hand, in the case of extension service between the information terminal 22H and other information terminal 23H, in order to communicate to the information terminal 23H, the address controller 29 of the information terminal 22H and the telephone line interface 28A modulate the identification address signal of the information terminal 23H into signal frequency band 21 of digital signal, and transmit through the private telephone line 17 by way of the transformer 25. In the information terminal 23H, by the transformer 25 and telephone line interface circuit 28A, the identification address digital signal is received, and when the identification address is recognized to be addressed to its own, the data is received.

Similarly, when sending a reply to the partner, by giving the partner's identification address, mutual communications are realized. It is made in the same way when communicating between 22H and 24H, and between 23H and 24H.

Thus, according to embodiment 9, in the case of extension service, it is possible to send and receive securely and easily with a specified partner by using the identification address, and if the number of terminals is increased or decreased, by exchange of initial data, increased or decreased identification addresses are stored in individual information terminals, so that it is possible to react easily as the system.

Embodiment 10

Figure 11:
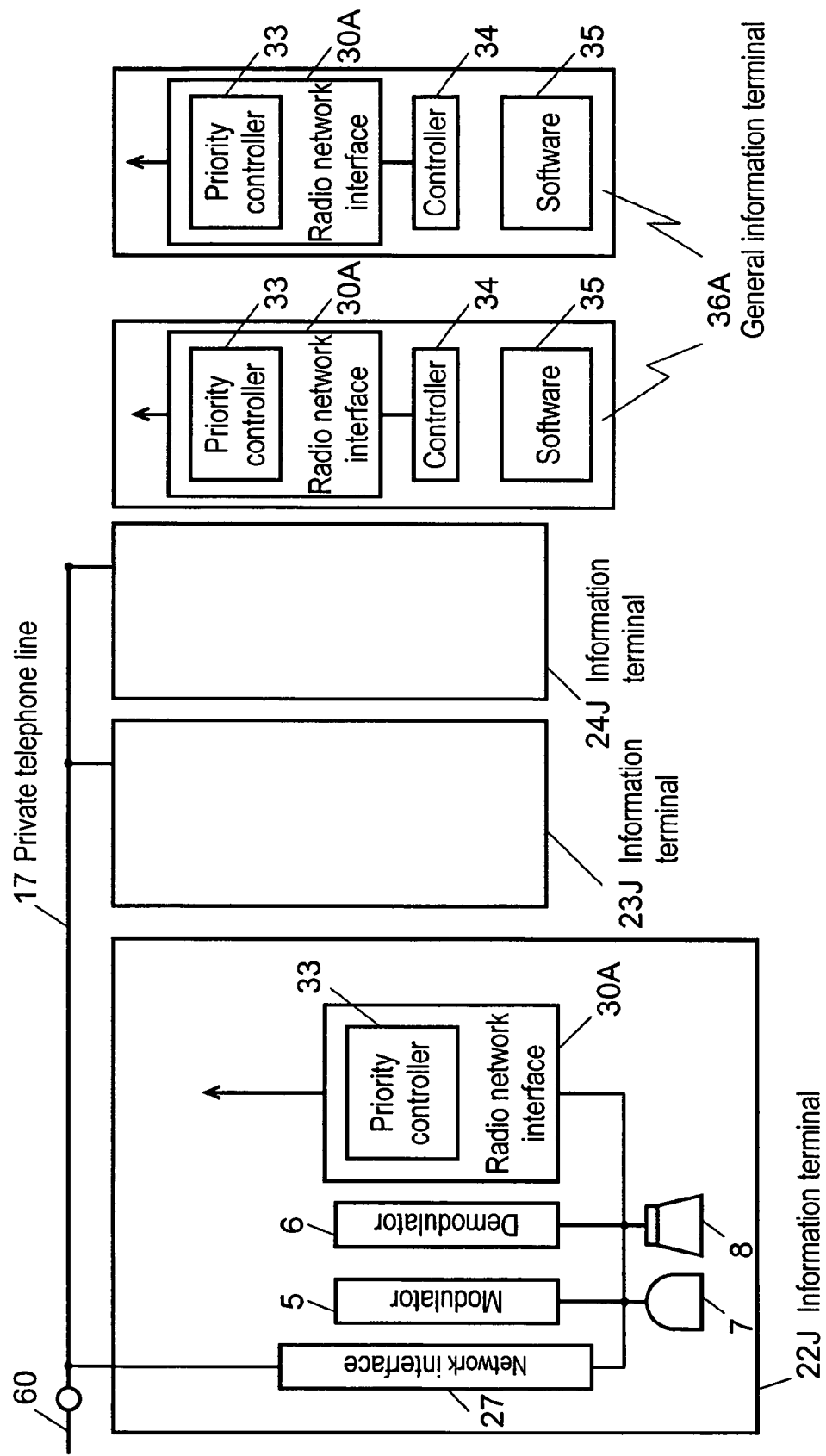
FIG. 11 is a block diagram showing a configuration of information terminal and information terminal system in embodiment 10 of the invention.

FIG. 11 is a block diagram showing a configuration of information terminal and information terminal system in embodiment 10 of the invention.

In FIG. 11, the same reference numerals as in embodiment 7 in FIG. 8 have the same functions. In the information terminals 22J, 23J, 24J, a network interface 27 is a conversion circuit for analog telephone.

In the information terminals 22J, 23J, 24J, and general information terminal 36A, a radio network interface 30A is a circuit for sending and receiving packetized digital information by radio wave. A priority controller 33 controls the priority among all information terminals capable of communicating through the radio network interface 30A, thereby allowing only the information terminal gaining the transmission right to send out the digital information issued from the controller 34 through the radio network interface 30A.

In the general information terminal 36A, a radio network interface 30A is the same radio network interface 30A as in the information terminals 22J, 23J, 24J. A controller 34 controls the general information terminal, and software 35 is mounted on the general information terminal.

In the information terminal having such a configuration, the operation is explained below.

The flow of an audio signal in the case of outside call sent from the information terminal 22J is as follows.

The audio signal entered from a microphone 7 of the information terminal 22J is modulated by the modulator 5, and is sent to the exchange through the subscriber's line 60 by way of the private telephone line 17.

To the contrary, an audio signal received at information terminal 22J that is sent from the exchange through the subscriber's line 60 is demodulated into an ordinary audio frequency band by the demodulator 6, and output from a speaker 8.

On the other hand, in the case of extension service between the information terminal 22J and other information terminal 23J or 24J, the audio signal entered from the microphone 7 of the information terminal 22J is converted into a packetized digital signal by the radio network interface 30A, and transmitted by radio wave.

At other information terminals 23J and 24J, the received packetized digital signal is demodulated by the radio network interface 30A into an analog signal, and is output from the speaker 8.

In the case of outside call from the information terminals 22J, 23J, 24J, it is possible to use the outside call by the network interface 27 of the information terminal 22J through the radio network interface 30A.

Thus, according to embodiment 10, the telephone signal frequency band 18 in FIG. 2 is used for outside call from the information terminal, and the packetized digital signal is sent by radio wave in the case of extension service. Accordingly, if outside call and extension service are used at the same time, no conflict of signals occurs, so that the service is smoothly done. In FIG. 11, meanwhile, all of the information terminals 22J, 23J, 24J are available for an outside call, but when the information terminal 22J is used as an exclusive interface for an outside call, the network interface 27 of the information terminals 23J, 24J can be omitted.

Further, by the priority controller 33, by controlling the priority among all of the information terminals 22J, 23J, 24J, and general information terminal 36A that can communicate through the radio network interface 30A, in particular, the real time data such as sound that is demanded to be minimized in the transfer delay time can be transferred by priority over other information terminals. Therefore, in the system including the general information terminal 36A handling other data than the sound, high quality transmission with less delay in sound can be realized.

Embodiment 11

Figure 12:
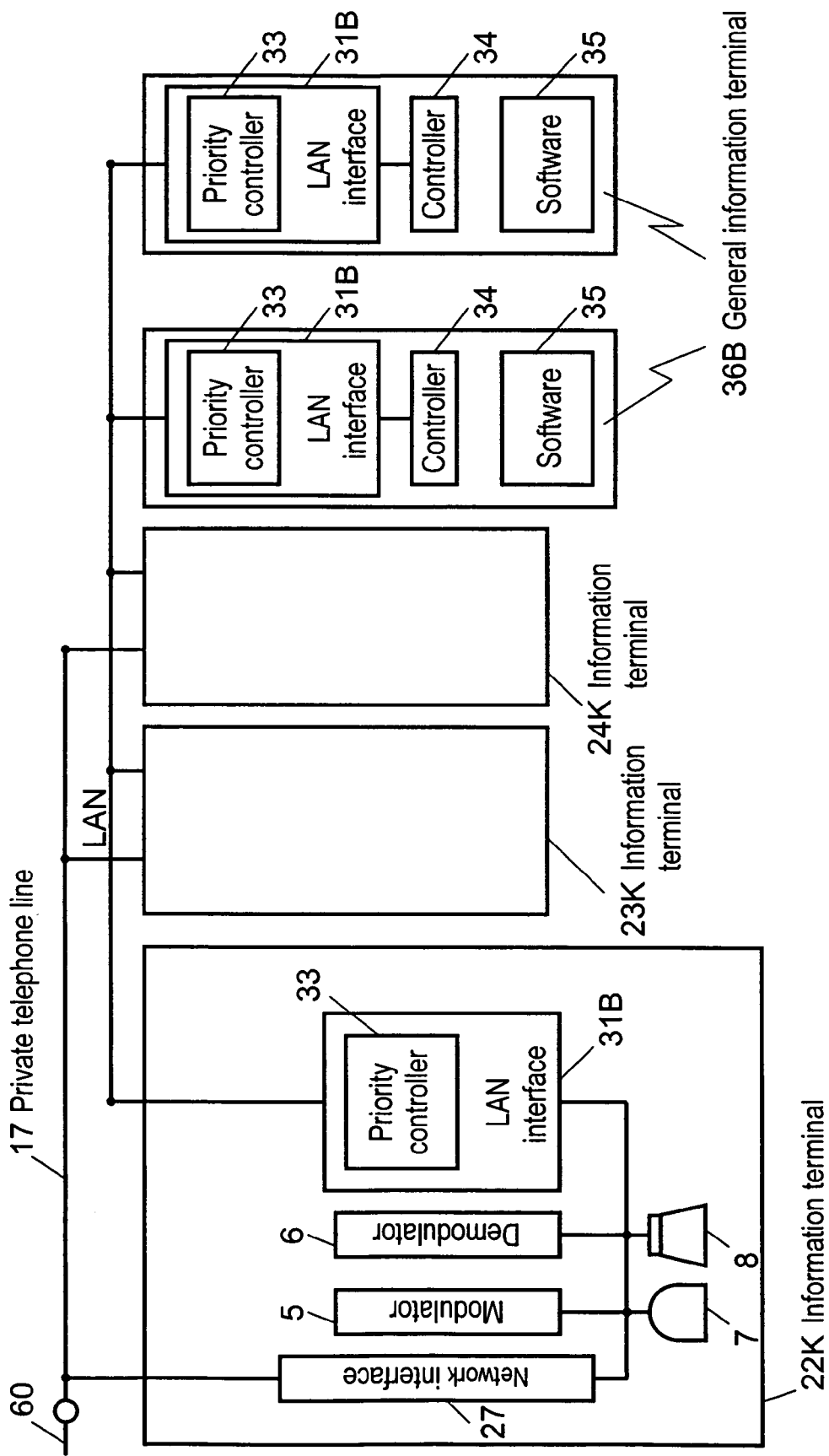
FIG. 12 is a block diagram showing a configuration of information terminal and information terminal system in embodiment 11 of the invention.

FIG. 12 is a block diagram showing a configuration of an information terminal and an information terminal system in embodiment 11 of the invention.

In FIG. 12, the same reference numerals as in embodiment 7 in FIG. 8 have the same functions.

In information terminals 22K, 23K, 24K, a network interface circuit 27 is a conversion circuit for analog telephone. ALAN interface 31B is a circuit for sending and receiving packetized digital information by CSMA/CD system.

In a general information terminal 36B, a LAN interface 31B is the same LAN interface 31B as in the information terminals 22K, 23K, 24K. A controller 34 controls the general information terminal, and software 35 is mounted on the general information terminal.

In the information terminal having such a configuration, the operation is explained below.

The flow of an audio signal in the case of an outside call sent from the information terminal 22K is as follows. The audio signal entered from a microphone 7 of the information terminal 22K is modulated by the modulator 5, and is sent to the exchange through the subscriber's line 60 by way of the private telephone line 17. To the contrary, the audio signal received at information terminal 22K that is sent from the exchange through the subscriber's line 60 is fed into the demodulator 6 to be demodulated into ordinary audio frequency band, and output from a speaker 8.

On the other hand, in the case of extension service between the information terminal 22K and other information terminal 23K or 24K, the audio signal entered from the microphone 7 of the information terminal 22K is converted into a packetized digital signal by the LAN interface 31B, and is transmitted through the LAN network. At other information terminal 23K or 24K, the received packetized digital signal is demodulated into an analog signal by the LAN interface 31B, and is output from the speaker 8.

Thus, according to embodiment 11, the telephone signal frequency band 18 in FIG. 2 is used for outside call from the information terminal, and the LAN interface 31B of packetized digital signal is used in the case of extension service. Therefore if incoming service and extension service are used at the same time, speeches can be exchanged smoothly without conflict of signals.

In FIG. 12, all of the information terminals 22K, 23K, 24K can be used in outside call, but if the information terminal 22K is used as an exclusive outside call, the network interface 27 of the information terminal 23K or 24K may be omitted.

Embodiment 12

Figure 13:
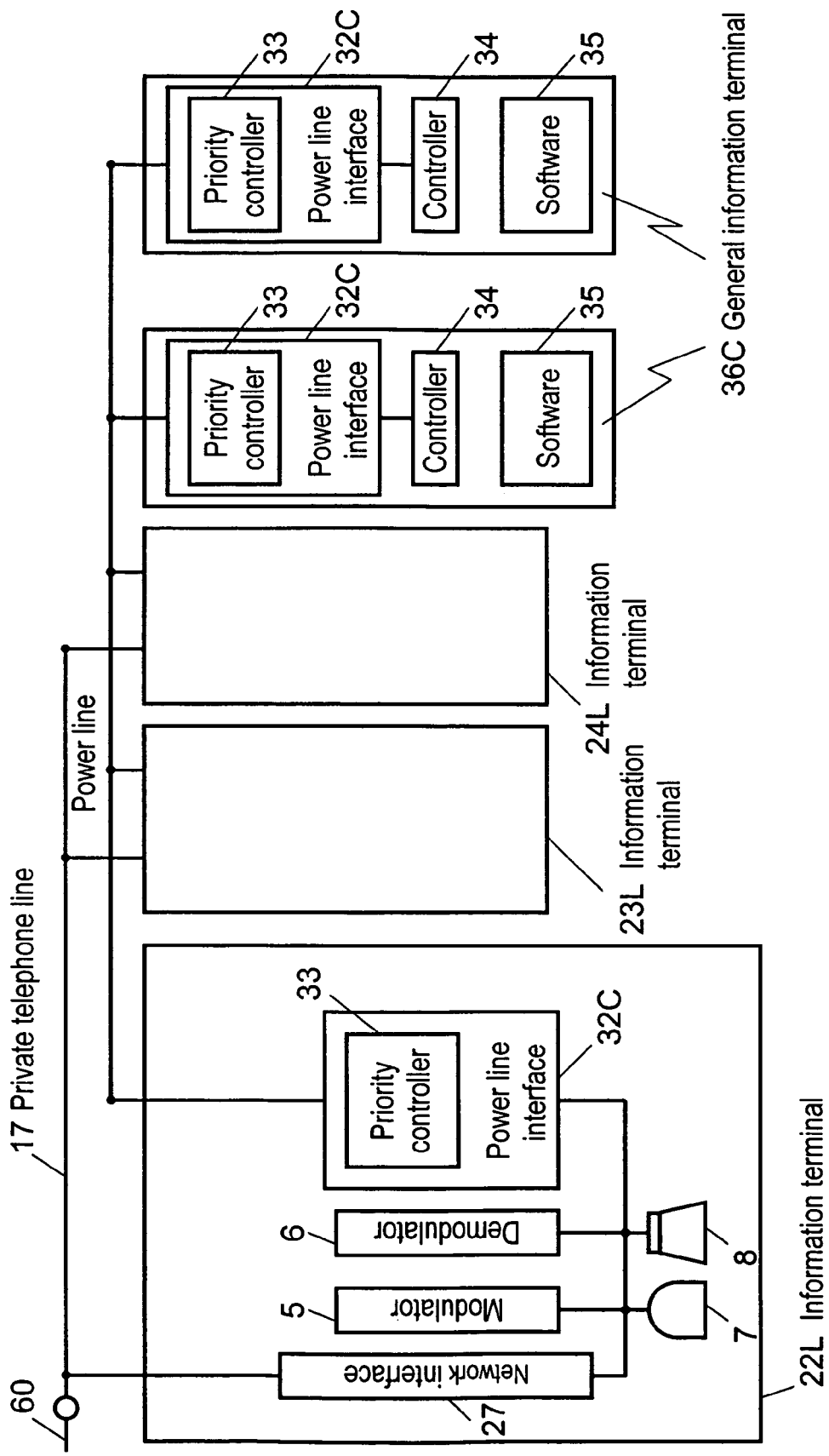
FIG. 13 is a block diagram showing a configuration of information terminal and information terminal system in embodiment 12 of the invention.

FIG. 13 is a block diagram showing a configuration of information terminal and information terminal system in embodiment 12 of the invention.

In FIG. 13, the same reference numerals as in embodiment 7 in FIG. 8 have the same functions.

In information terminals 22L, 23L, 24L, a network interface circuit 27 is a conversion circuit for an analog telephone. A power line interface 32C is a circuit for sending and receiving packetized digital information signal by using the power source line.

In a general information terminal 36C, the power line interface 32C is the same as the power line interface in the information terminals 22L, 23L, 24L, and is a circuit for sending and receiving packetized digital information by using the power line. A controller 34 controls the general information terminal, and software 35 is mounted on the general information terminal.

In the information terminal having such a configuration, the operation is explained below.

The flow of an audio signal in the case of outside call sent from the information terminal 22L is as follows. The audio signal entered from a microphone 7 of the information terminal 22L is modulated by the modulator 5, and is sent to the exchange through the subscriber's line 60 by way of the private telephone line 17.

To the contrary, an audio signal received at information terminal 22L that is sent from the exchange through the subscriber's line 60 is fed into the demodulator 6 to be demodulated into ordinary audio frequency band, and output from a speaker 8.

On the other hand, in the case of extension service between the information terminal 22L and other information terminal 23L or 24L, the audio signal entered from the microphone 7 of the information terminal 22L is converted into a packetized digital signal by the power line interface 32C, and is transmitted through the power line.

At other information terminal 23L or 24L, the packetized digital signal is demodulated into an analog signal by each power line interface 32C, and is output from the speaker 8.

Thus, according to embodiment 12, the telephone signal frequency band 18 in FIG. 2 is used for an outside call from the information terminal, and the power line interface of the packetized digital signal is used in the case of extension service. Therefore if an outside call and extension service are used at the same time, speech can be exchanged smoothly without conflict of signals. In FIG. 13, all of the information terminals 22L, 23L, 24L can be used in outside call, but if the information terminal 22L is used as an exclusive outside call, the network interface 27 of the information terminal 23L or 24L may be omitted.

Embodiment 13

Figure 14:
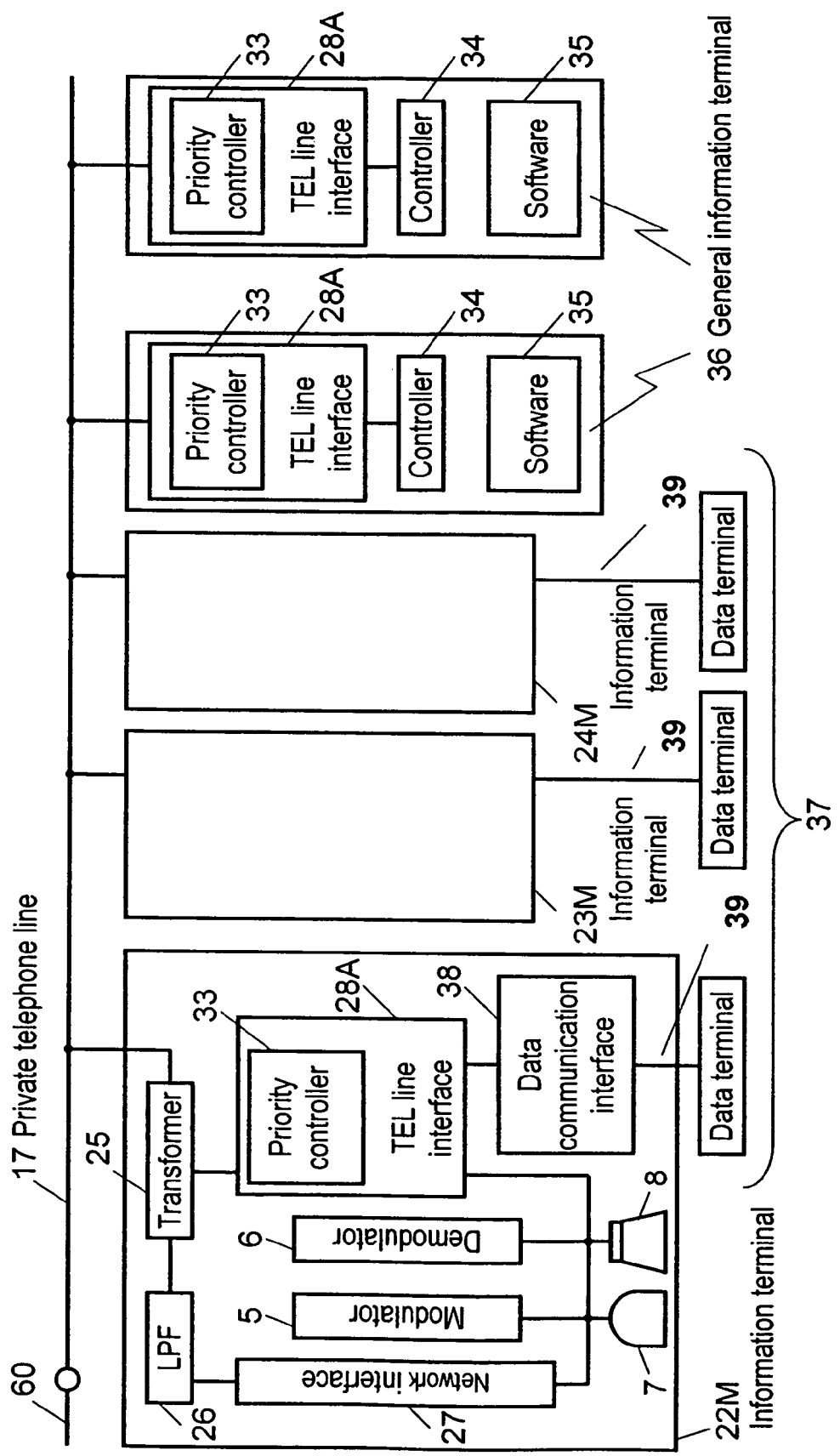
FIG. 14 is a block diagram showing a configuration of information terminal and information terminal system in embodiment 13 of the invention.

FIG. 14 is a block diagram showing a configuration of an information terminal and an information terminal system in embodiment 13 of the invention.

In FIG. 14, the same reference numerals as in embodiment 7 in FIG. 8 have the same functions.

In information terminals 22M, 23M, 24M, a transformer 25 sends and receives analog and digital signals to and from the private telephone line 17. An LPF 26 passes analog signals only. A network interface 27 is a conversion circuit for analog telephone. A telephone line interface 28A is a circuit for sending and receiving packetized digital information signal through the private telephone line 17 according to the CSMA/CD system. A data communication interface 38 is an interface for connecting an external data terminal 37, and it is connected by using USB in embodiment 13.

The data communication interface 38 is also a circuit for communicating with external terminal, or other information terminals 22M, 23M, 24M, or general information terminal 36, by way of the telephone line interface 28A

In the general information terminal 36, a telephone line interface 28A is the same as the interface 28A in the information terminals 22M, 23M, 24M, a controller 34 controls the general information terminal, and software 35 is mounted on the general information terminal.

In the information terminals 22M, 23M, 24M, and the general information terminal 36, a priority controller 33 controls the priority among all information terminals connected to the private telephone line 17, thereby allowing only the information terminal gaining the transmission right to send out the digital information issued from the telephone line interface 28A or controller 34 to the private telephone line 17.

In this embodiment, the system frequency band is as shown in FIG. 2. In FIG. 2, a frequency band 18 is for an ordinary telephone signal, and a signal frequency band of digital signal 21 is for sending and receiving packetized digital information through the private telephone line 17 by the CSMA/CD system.

In the information terminal having such configuration, the operation is explained below.

The flow of an audio signal in the case of outside call sent from the information terminal 22M is as follows.

The audio signal entered from a microphone 7 of the information terminal 22M is modulated into a telephone signal frequency band 18 in FIG. 2 by the modulator 5, and is sent to the exchange through the subscriber's line 60 by way of the LFP 26 and transformer 25.

To the contrary, an audio signal received at information terminal 22M that is sent from the exchange through the subscriber's line 60 is fed into the transformer 25 and LPF 26 where necessary signal components are taken out, and is further sent into the demodulator 6 to be demodulated into ordinary audio frequency band, and output from a speaker 8.

On the other hand, the data transmitted from the data terminal 37 through the USB is taken into the information terminals 22M, 23M, 24M through the data communication interface 38. The data is further sent out from the information terminals 22M, 23M, 24M to the data terminal 37 through the USB 39 by way of the data communication interface 38.

The data arriving at the data communication interface 38 from the data terminal 37 through the USB 39 is further transmitted to the other information terminals 22M, 23M, 24M through the telephone line interface 28A, thereby communicating with the data terminals connected to different information terminals.

In this case, when sending out the data to the private telephone line 17, a priority controller 33 controls the priority between the audio information from the microphone 7 and the data information from the data terminal 37 within the same information terminal. Generally, the sound is processed by priority over data, and the data from the data terminal 37 is forced to wait until the audio packet data is transmitted.

Besides, the data transmitted from the data terminal 37 occupies many bands, and in order to avoid drop of throughput or loss of packet due to increase of traffic on the private telephone line 17, the data communication interface 38 has a band limiter, and the data band to be sent out to the telephone line interface 28A is limited depending on the situation of the communication traffic.

Thus, according to embodiment 13, both outside call and extension service are possible simultaneously from the information terminal, and setting or maintenance of the information terminal from the data terminal is possible through the data communication interface. It is also possible to communicate data between the data terminal connected to other information terminals or the general information terminal. Further, priority control is applied when the data are sent out to the telephone line. Thus sound and other data required to be accurate in a delay condition can be sent out by giving appropriate priority. Moreover, by limiting the band of the data having a wide band, priority information such as sound is protected, and the communications quality is improved.

The user has only to connect the information terminal of the invention to the private telephone line, so that an easy and flexible network system can be built up.

In the embodiment, the USB 39 is used as the data communication interface, but the data communication interface could be RS-232C, SCSI, printer port or Ethernet. In embodiments 8 to 12, likewise, the similar operation is possible by adding the data communication interface. This embodiment is only an example, and may be realized in other structure having the same functions.

Embodiment 14

Embodiment 14 of the invention is explained below.

Figure 15:
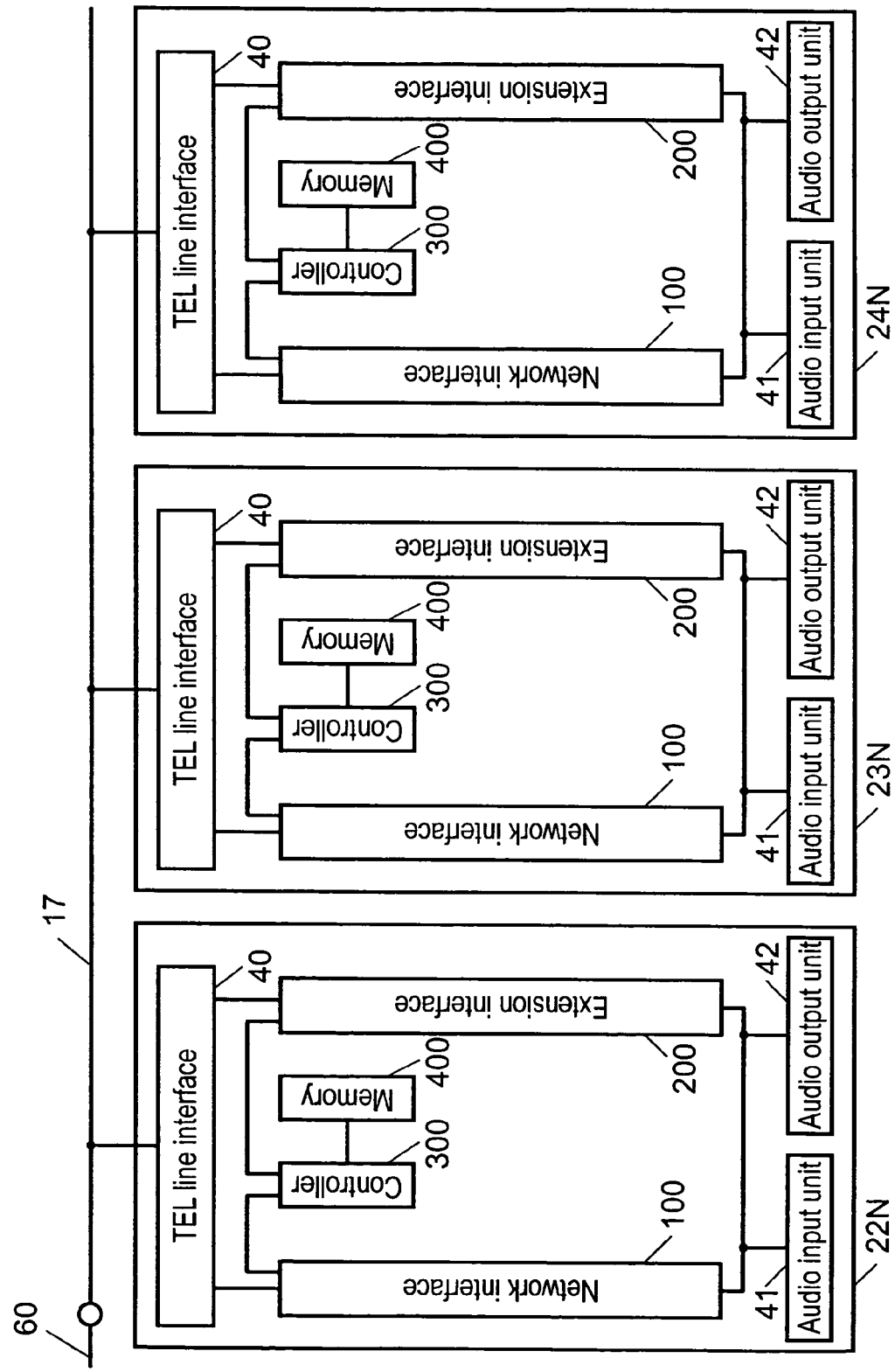
FIG. 15 is a block diagram showing a configuration of information terminal and information terminal system in embodiment 14 of the invention.

FIG. 15 is a block diagram showing a configuration of information terminal and information terminal system in embodiment 14 of the invention.

In FIG. 15, plural information terminals are connected to the private telephone line 17. The private telephone line 17 is connected to the subscriber's line 60 which is linked to the exchange. Plural information terminals 22N, 23N, 24N, . . . are connected parallel to the subscriber's line 60 through the private telephone line 17.

In the information terminals 22N, 23N, 24N, a telephone line interface 40 includes a transformer and a low pass filter, and sends and receives analog and digital signals to and from the private telephone line 17. A network interface 100 is a conversion circuit for analog telephone. An extension interface 200 is a circuit for sending and receiving packetized digital information through the private telephone line 17 by the CSMA/CD system. An audio input unit 41 is composed of a microphone and a modulator of an entered audio signal. An audio output unit 42 is composed of a demodulator of a transmitted audio signal, and a speaker.

In this embodiment, the system frequency band is as shown in FIG. 2. In FIG. 2, a frequency band 18 is for an ordinary audio, and a signal frequency band of digital signal 21 is for sending and receiving packetized digital information through the private telephone line 17 by the CSMA/CD system.

In the information terminal having such configuration, the operation is explained below. The flow of an audio signal in the case of outside call sent from the information terminal 22N is as follows.

The audio signal entered from the audio input unit 41 of the information terminal 22N is modulated into an audio frequency band 18 in FIG. 2, and is sent to the exchange through the subscriber's line 60 by way of the telephone line interface 40.

To the contrary, an audio signal received at information terminal 22N that is sent from the exchange through the subscriber's line 60 is fed into the telephone line interface 40 where necessary signal components are taken out, and is demodulated into ordinary audio frequency band by the audio output unit 42, and output.

On the other hand, in the case of extension service between the information terminal 22N and other information terminal 23N or 24N, or in the case of data communication between information terminals, the flow of a signal sent from information terminal 22N is as follows.

The entered audio signal or data signal is converted into a packetized digital data by the extension interface 200, and is further modulated into signal frequency band 21, and is transmitted to the private telephone line 17 through the telephone line interface 40.

At another information terminal 23N or 24N, the packetized digital data is received by the telephone line interface 40 and extension interface 200. When the packet data is audio data of extension service, it is output from the audio output unit 42, or in the case of data, a controller 300 controls the data so as to be held in a memory 400.

To realize mutual communications between information terminals, identification addresses for distinguishing the information terminals assigned to the individual information terminals are used. The identification addresses may be either MAC addresses used in ordinary LAN, IP addresses or original addresses. In the extension interface 200, when transmitting, the identification address of the destination is added to the packetized data and transmitted, and when receiving, the identification address attached to the data is reviewed, and only when it is addressed to its own address, the data is received. Thus, mutual communications between information terminals may be realized.

Thus, according to embodiment 14, the audio frequency band 18 in FIG. 2 is used in the case of an outside call from the information terminal, and the signal frequency band 21 of packetized digital signal is used in the case of extension service or data communication between information terminals. Accordingly, if an outside call, extension service, and data communication between information terminals are used at the same time, since the frequency bands to be used are different, no conflict of signals occurs.

Further in extension service and data communication between information terminals, since packetized digital data is transmitted, both extension service and data communication between information terminals can be executed simultaneously. That is, without depending on the busy state of the outside call line or extension line, data communication between information terminals is realized.

Still more, the data received by data communication between information terminals is held in the memory 400, and taken out whenever necessary, or the data preliminarily held in the memory 400 may be transmitted to other information terminal, so that the message function may be realized.

Embodiment 15

Figure 16:
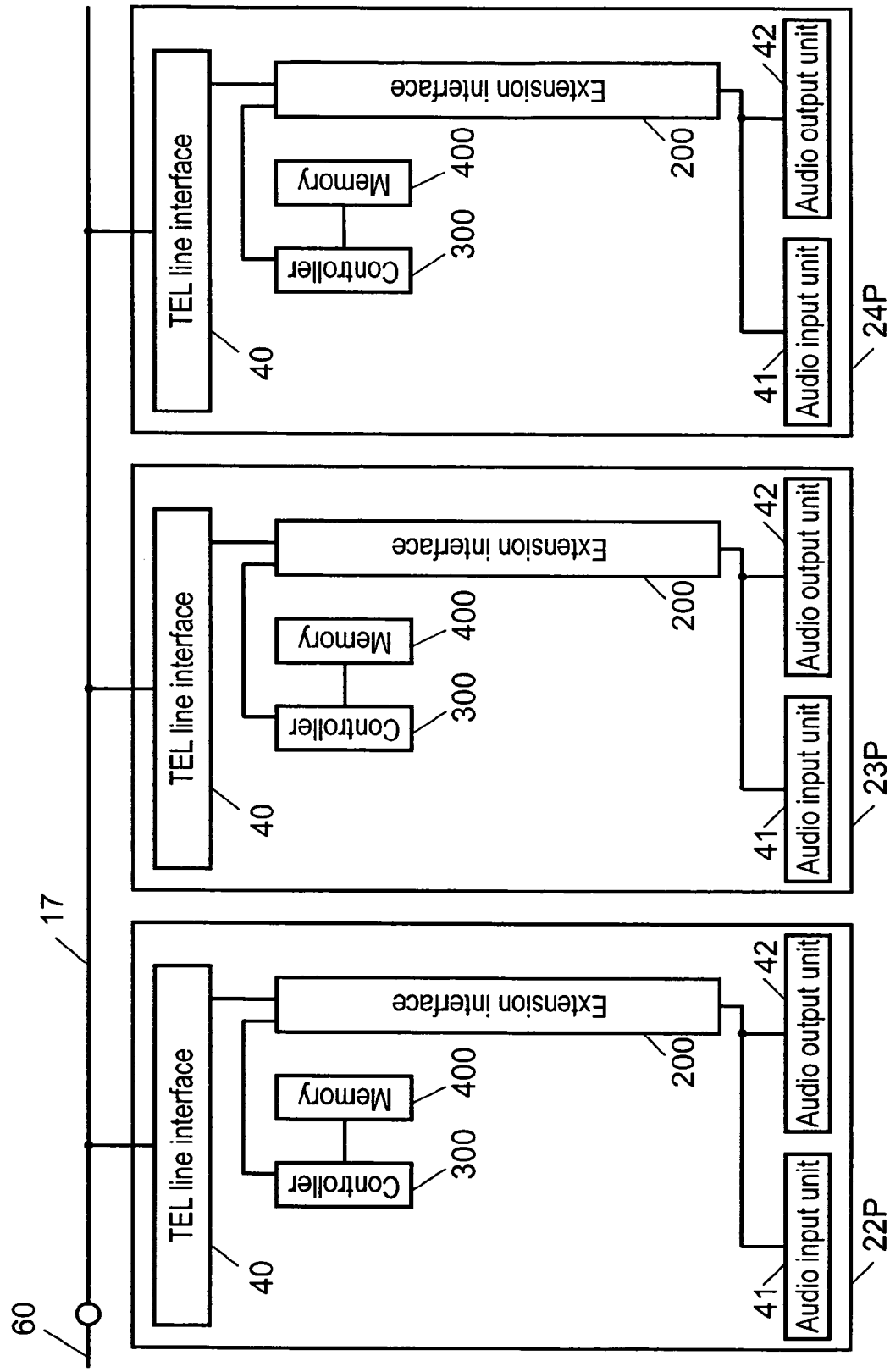
FIG. 16 is a block diagram showing a configuration of information terminal and information terminal system in embodiment 15 of the invention.

FIG. 16 is a block diagram showing a configuration of information terminal and information terminal system in embodiment 15 of the invention.

In FIG. 16, the same reference numerals as in embodiment 14 in FIG. 15 have the same functions. In embodiment 15, packetized digital data is used also in outside call, and only the signal frequency band 21 of digital signal for sending and receiving packetized digital information in FIG. 2 is used.

In the information terminal having such a configuration, the operation is explained below.

The flow of an audio signal in the case of outside call sent from the information terminal 22P is as follows.

The audio signal entered from an audio input unit 41 of the information terminal 22P is converted into a packetized digital signal by the extension interface 2, and is further modulated into a signal frequency band 21, and is transmitted through the private telephone line 17 by way of the telephone line interface 40, and is sent out to the exchange through the subscriber's line 60. To the contrary, an audio signal received at information terminal 22P that is sent from the exchange through the subscriber's line 60 is fed into the telephone line interface 40 and extension interface 200, and demodulated from the packetized digital signal into an analog signal and is output from the audio output unit 42.

On the other hand, in the case of extension service between the information terminal 22P and other information terminal 23P or 24P, or in the case of data communication between information terminals, the flow of signal sent from information terminal 22P is as follows.

The entered audio signal or data signal is converted into a packetized digital data by the extension interface 200, and is further modulated into signal frequency band 21, and is transmitted to the private telephone line 17 through the telephone line interface 40. At another information terminal 23P or 24P, the packetized digital data is received by the telephone line interface 40 and extension interface 200, and when the sent packet data is audio data of extension service, it is output from the audio output unit 42, or in the case of data, a controller 300 controls so as to be held in a memory 400.

To realize mutual communications between information terminals, identification addresses for distinguishing the information terminals assigned to the individual information terminals are used. The identification addresses may be either MAC addresses used in ordinary LAN, IP addresses or original addresses. In the extension interface 2, when transmitting, the identification address: of the destination is added to the packetized data and transmitted, and when receiving, the identification address attached to the data is reviewed, and only when it is addressed to its own address, the data is received. Thus, mutually communications between information terminals may be realized.

Thus, according to embodiment 15, only the signal frequency band 21 of packetized digital signal is used in the cases of an outside call and extension service from the information terminal and further for data communication. Since all data are packetized digital data, however, whether the outside call is busy or the extension line is busy, it is possible to send and receive data between information terminals, or send and receive an outside call and an extension service between information terminals. As a result, the message function mentioned in embodiment 14 may be also realized with the outside call.

Embodiment 16

Figure 17:
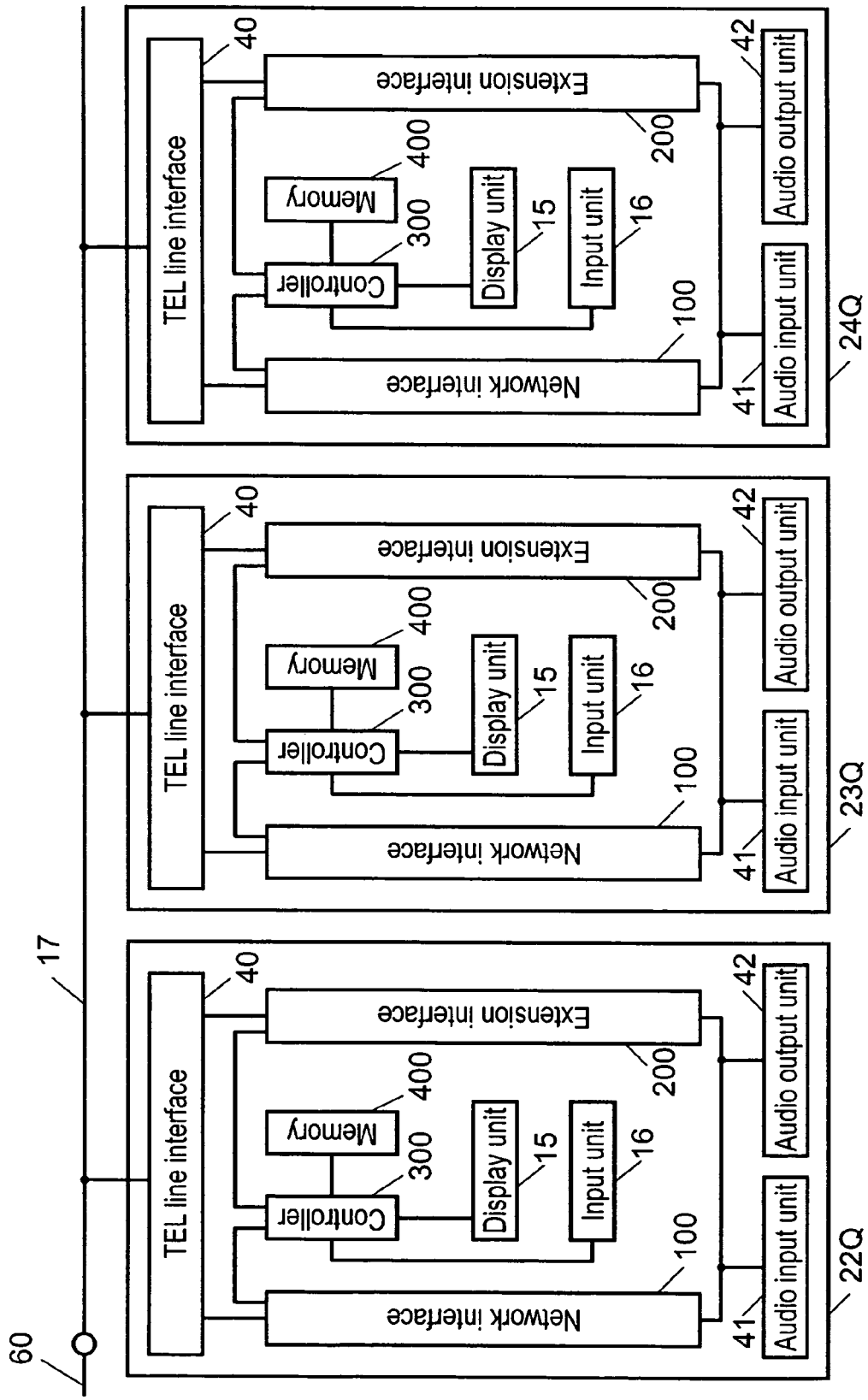
FIG. 17 is a block diagram showing a configuration of information terminal and information terminal system in embodiment 16 of the invention.

FIG. 17 is a block diagram showing a configuration of information terminal and information terminal system in embodiment 16 of the invention.

In FIG. 17, the same reference numerals as in embodiment 14 in FIG. 15 have the same functions. An input unit 16 is keypad, pointing device, touch panel, scanner, camera or the like, and a display unit 15 is LCD, monitor or the like.

In the information terminal having such configuration, the operation is explained below.

The flow of an audio signal in the case of outside call sent from the information terminal 22Q is as follows. The audio signal entered from an audio input unit 41 of the information terminal 22Q is modulated into an audio frequency band 18 in FIG. 2, and is sent to the exchange through the subscriber's line 60 by way of a telephone line interface 40. To the contrary, an audio signal received at information terminal 22Q that is sent from the exchange through the subscriber's line 60 is fed into the telephone line interface 40 where necessary signal components are taken out, and demodulated into an ordinary audio frequency band by an audio output unit 42, and is output.

On the other hand, in the case of extension service between the information terminal 22Q and other information terminal 23Q or 24Q, or in the case of data communication between information terminals, the flow of a signal sent from information terminal 22Q is as follows. The audio signal or data signal entered in the information terminal 22Q is converted into a packetized digital data by an extension interface 200, and is further modulated into signal frequency band 21, and is transmitted to the private telephone line 17 through the telephone line interface 40. At another information terminal 23Q or 24Q, the packetized digital data is received by the telephone line interface 40 and extension interface 200, and when the sent packet data is audio data of extension service, it is output from the audio output unit 42, or in the case of data, a controller 300 controls the data so as to be held in a memory 400.

To realize mutual communications between information terminals, identification addresses for distinguishing the information terminals assigned to the individual information terminals are used. The identification addresses may be either MAC addresses used in ordinary LAN, IP addresses or original addresses. In the extension interface 200, when transmitting, the identification address of the destination is added to the packetized data and transmitted, and when receiving, the identification address attached to the data is reviewed, and only when it is addressed to its own address, the data is received. Thus, mutually communications between information terminals may be realized.

Thus, according to embodiment 16, the audio frequency band 18 in FIG. 2 is used in the case of outside call from the information terminal, and the signal frequency band 21 of packetized digital signal is used in the case of extension service or the data communication between information terminals. Accordingly, if an outside call, extension service, and data communication between information terminals are used at the same time, since the frequency bands to be used are different, no conflict of signals occurs. Also in both extension service and a data communication between information terminals, since packetized digital data is used, the extension service and data communication between information terminals can be executed at the same time. That is, data communication between information terminals is possible regardless of the busy status of the outside call or the extension line.

The data handled in a data communication between information terminals is audio, text, video and others, when desired to transmit such data, it is possible to send by entering through an input device of the input unit 16 depending on the type of the data (entering in the case of audio, for example, by the audio input unit 41). When the data is received, it can be shown in a display device of the display unit 15 depending on the type of the data (shown in the case of audio, for example, in the audio output unit 42). In the embodiment, the information of the input unit 16 of the information terminal can be obtained from an external information device through the subscriber's line. In the foregoing embodiments, the telephone line has been explained as the physical layer of data transmission and reception, but not limited to this, it can be realized, for example, by wireless means, Ethernet, or power line.

Embodiment 17

Figure 18:
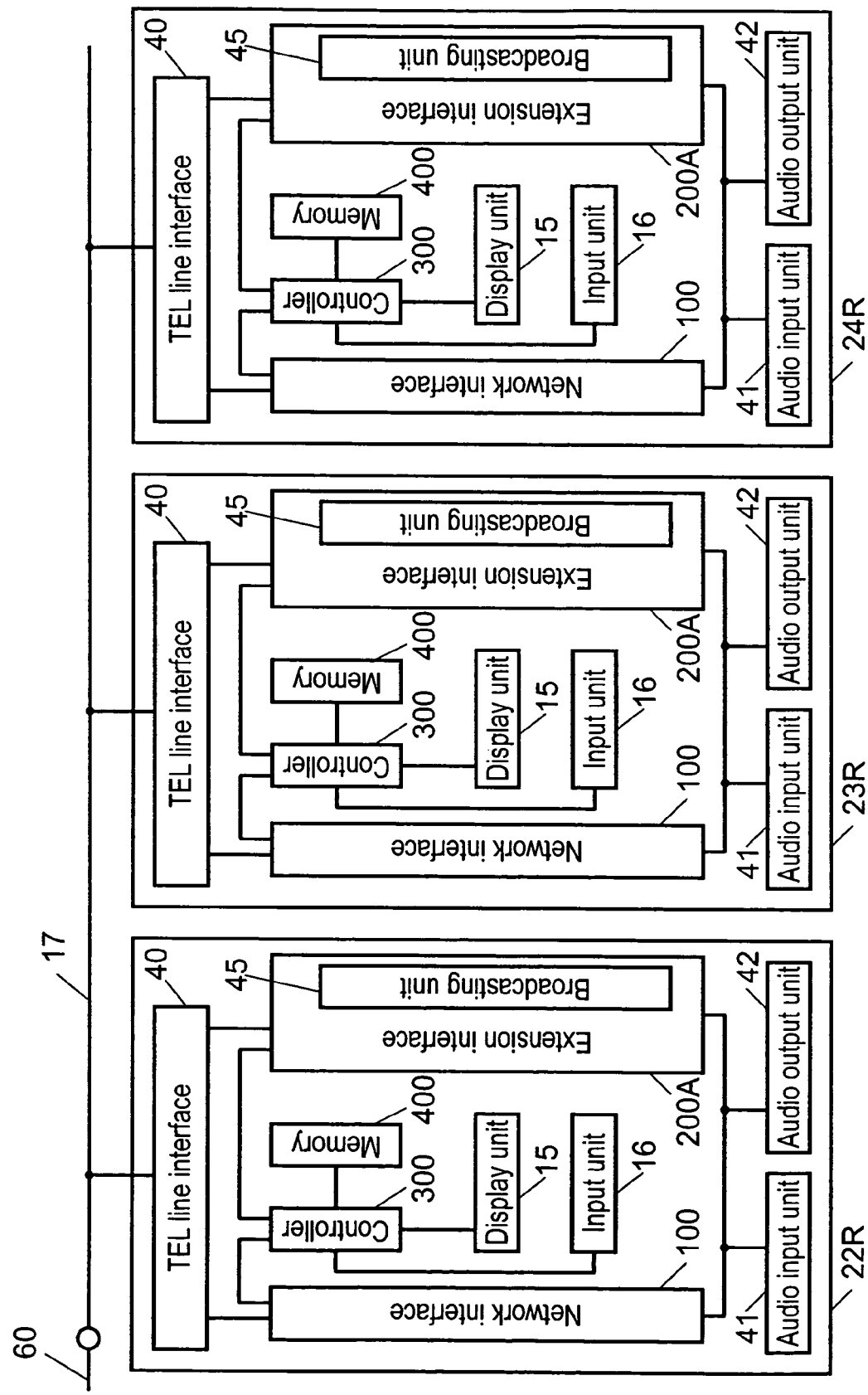
FIG. 18 is a block diagram showing a configuration of information terminal and information terminal system in embodiment 17 of the invention.

FIG. 18 is a block diagram showing a configuration of information terminal and information terminal system in embodiment 17 of the invention.

In FIG. 18, the same reference numerals as in embodiment 16 in FIG. 17 have the same functions. A broadcasting unit 45 is provided in an extension interface 2A, and controls transmission and reception of broadcast message.

In the information terminal having such a configuration, the operation is explained below.

When an information terminal 22R sends data to all information terminals 23R, 24R, . . . connected to the information terminal system, a broadcast address is added to the packetized data and transmitted by means of the broadcasting unit 45. The broadcast address is, different from the identification address, an address expressing all information terminals connected to the information terminal system, not expressing a specific information terminal, and, for example, a broadcast address in MAC, a multicast address or broadcast address in IP, or an original broadcast address may be used. At the information terminals 23R and 24R, when receiving this data, it is checked whether an address added by the broadcasting unit 45 is a broadcast address, and in the case of broadcast address, the data is received regardless of its own identification address, and according to the information, the display information is displayed in the display unit 15, or the audio information is issued to the audio output unit 42.

Thus, according to embodiment 17, a message can be transmitted to all information terminals connected to the information terminal system.

Embodiment 18

Figure 19:
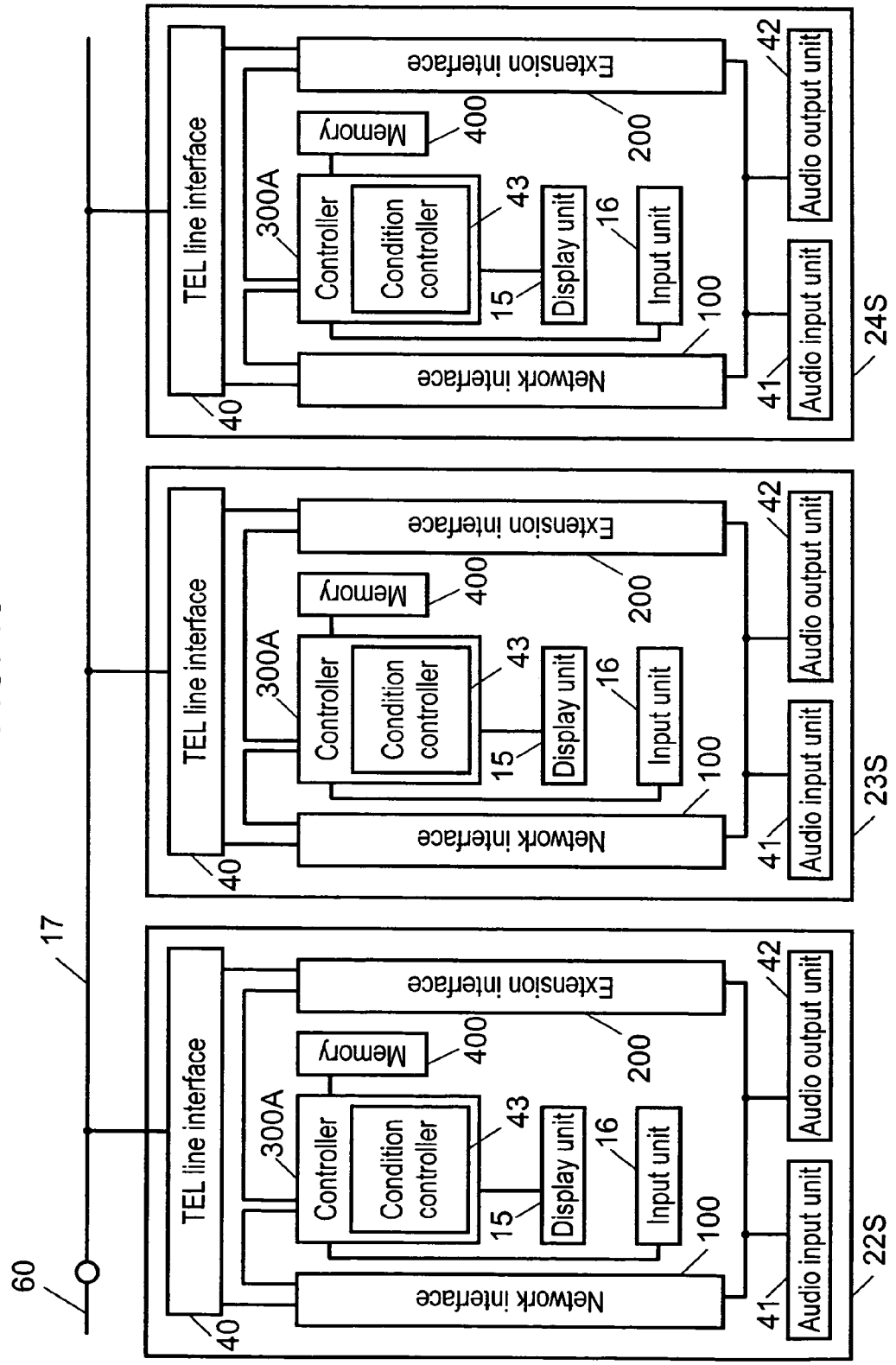
FIG. 19 is a block diagram showing a configuration of information terminal and information terminal system in embodiment 18 of the invention.

FIG. 19 is a block diagram showing a configuration of information terminal and information terminal system in embodiment 18 of the invention.

In FIG. 19, the same reference numerals as in embodiment 16 in FIG. 17 have the same functions. A condition controller 43 is provided in a controller 3A, and controls the user's present status, such as idle, busy with outside call, busy with an extension line, absent, or "Don't Disturb."

In the information terminal having such a configuration, the operation is explained below.

The controller 300A of the information terminals 22S, 23S, 24S includes the condition controller 43 which controls the user's condition, such as idle, busy with outside call, busy with extension line, absent, or "Don't Disturb." The condition is set either by the information terminal itself by judging from its own state, or by the user.

Even in an idle state, if not replying for a specific time to the call from other information terminal, it may be set in the absent state for a while. Such a state is controlled by the condition controller 43.

If called from the information terminal 23S while the information terminal 22S is in a state not able to reply such as busy with outside call, busy with extension line, absent, or "Don't Disturb," the call is transmitted to the condition controller 43 through the extension interface 200 of the information terminal 22S which is the sender. The condition controller 43 checks its own state, and if found not able to reply, message data preliminarily held in a memory 400 is returned to the sender or the information terminal 23S. The information terminal 23S receives this message data, and issues it to the display unit 15 (to the audio output unit 42 in the case of audio data). As a result, the user of the information terminal 23S knows that the user of the information terminal 22S is in a state not able to reply. The message data to be preliminarily held in the memory 400 differs in each state not able to reply, and can be set by the user according to each state. The message data is not limited, and may include data, audio, video, etc.

When the information terminal 22S returns an audio message to the information terminal 23S of the sender, and then an audio message is sent from the information terminal 23S, the information terminal 22S can held it in its memory, so that a voice mail function is realized. Herein, the message data is not limited to audio, but when combined with various message data such as data and video, versatile voice mail functions may be realized.

Embodiment 19

Figure 20:
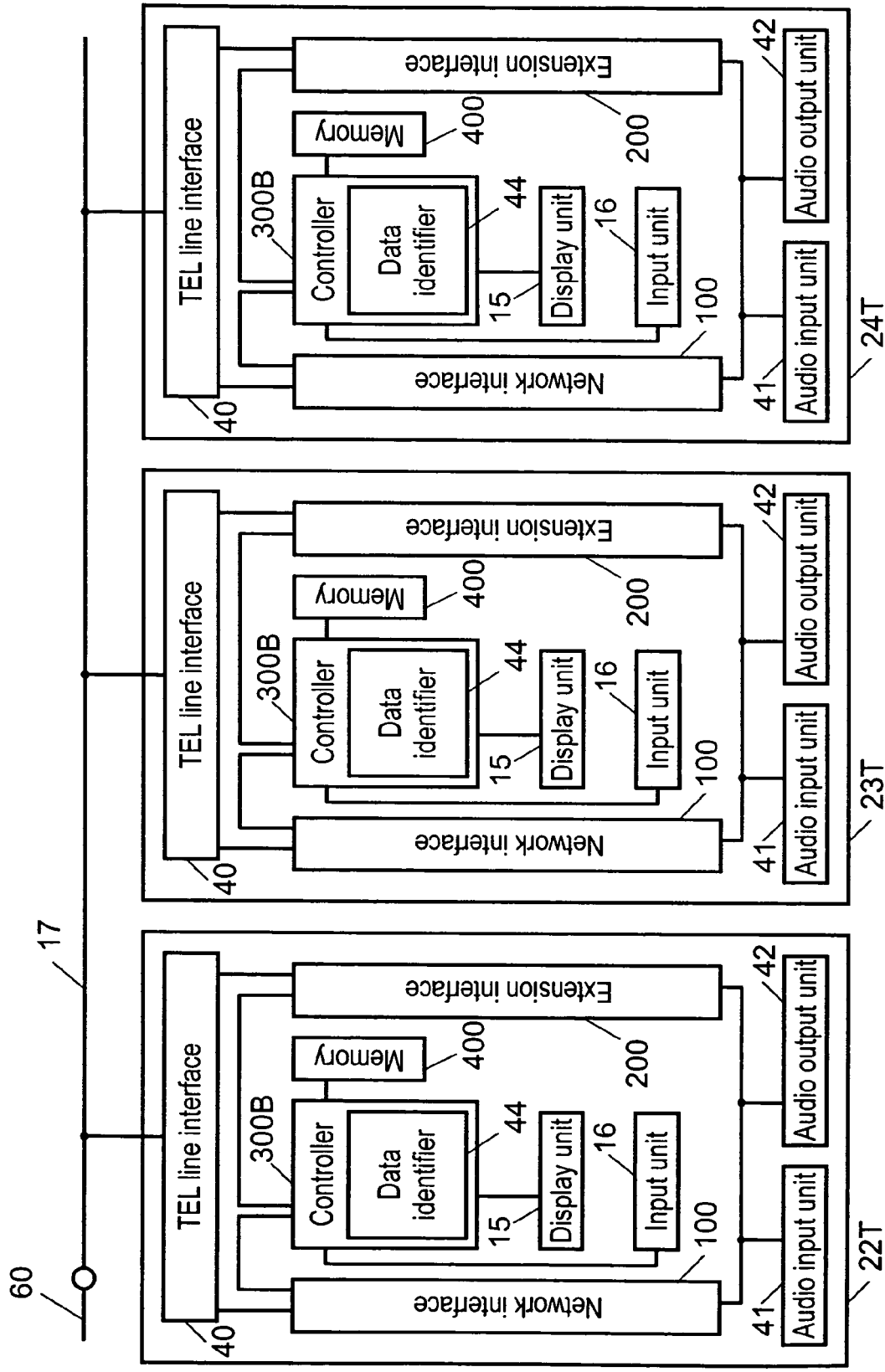
FIG. 20 is a block diagram showing a configuration of information terminal and information terminal system in embodiment 19 of the invention.

FIG. 20 is a block diagram showing a configuration of information terminal and information terminal system in embodiment 19 of the invention.

In FIG. 20, the same reference numerals as in embodiment 16 in FIG. 17 have the same functions.

A data identifier 44 is provided in a controller 3B, and identifies the type of the message data held in the memory, such as data, audio, video, etc.

FIG. 21 shows a memory table composition in the embodiment.

In the information terminal having such a configuration, the operation is explained below.

Data handled in data communication between information terminals includes audio, text, video and others, and when receiving such data from other information terminals, a table as shown in FIG. 21 is provided in the memory 400, and the data is held together with the number identifying the message, the message receiving date, message sender's information, and type of message. The content of the table can be referred to from the outside through the display unit 15, and the message desired to be taken out can be selected by an input unit 16. When a message is selected, the type of the message is judged by the data identifier 44, and it is issued to the output device that is most suited as the output device of this message. For example, when an audio message is selected, it is delivered to the speaker of the audio output unit 42, or in the case of text or video, it is delivered to the LCD or monitor of the display unit 15.

Thus, according to embodiment 19, without requiring user's consciousness about the type of the message, the message function is realized easily.

According to the invention, as described in the foregoing embodiments, since individual information terminals are provided with extension interface, digital data such as audio, data or video can be transmitted and received regardless of the speech state such as outside call or extension service, so that a flexible message system can be built up.

Further, since all individual information terminals are provided with a modulator for extension service and a network interface, and also priority control function and a data communication interface, extension service is available by other telephone set during outside call.

It is also easy to extend and remove, and audio and other data not desired to be delayed can be transmitted by priority, and it is moreover possible to communicate between a data terminal and an information terminal, between data terminals connected to an information terminal, or between a data terminal connected to an information terminal and a general information terminal, so that an easy and flexible network system can be built up.

The interface of the invention is not limited to the illustrated embodiments alone, and the type and number of physical layers of the interface are not particularly specified.

These embodiments are mere examples, and the system can be built up by combining these embodiments, or not limited to the scope of the telephone, it can be used in other data and video terminals, and yet the Media Access Control is explained by the CSMA/CD system in the embodiments, but it can be also realized by TDMA system or other system. Further, the network interface is explained as one network, but the invention may be also applied in the system composed of plural networks.

What is claimed is:

1. A communication apparatus connected to an information terminal through a power line, the communication apparatus being connected to a subscriber's line, the communication apparatus comprising:

an output interface that outputs an analog signal, and a modulator that modulates the analog signal into a modulated analog signal in a first frequency band, and a network interface that converts the modulated analog signal to a further modulated analog signal including analog data and outputs the further modulated analog signal to the outside through the subscriber's line using the first frequency band, and a power line interface that converts the analog signal to a digital signal including packetized digital data and outputs the digital signal to the information terminal through the power line using a second frequency band, the second frequency band being higher than the first frequency band, wherein the first frequency band and the second frequency band do not overlap in frequency, and wherein the input interface, the network interface and the power line interface are integrated in the communication apparatus.

2. The communication apparatus of claim 1, wherein the communication apparatus is connected to an exchange through a subscriber's line, the analog data is audio data, said network interface communicates the further modulated analog signal including the audio data to the exchange through the subscriber's line.

3. The communication apparatus of claim 2, further comprising:

a microphone that receives sound as the audio data, and a speaker that outputs the audio data as sound.

4. The communication apparatus of claim 1, wherein the packetized digital data is audio data or video data or a combination of them.

5. The communication apparatus of claim 1, wherein said power line interface communicates the digital signal to said another information terminal according to CSMA.

6. The communication apparatus of claim 5, wherein the CSMA is CSMA/CD.

7. The communication apparatus of claim 5, wherein the CSMA is CSMA/CA.

8. The communication apparatus of claim 1, wherein said power line interface communicates the digital signal to the information terminal according to TDMA.

9. The communication apparatus of claim 1, further comprising:

a priority controller that controls a transmission right, wherein said communication apparatus is connected to a plurality of information terminals, the plurality of information terminals including the information terminal, when said priority controller gains the transmission right, said power line interface communicates the digital signal to at least one of the plurality of information terminals.

10. A communication method for executing communication between a communication apparatus and an information terminal through a power line, and for executing communication through a subscriber's line, the communication method comprising:

outputting an analog signal;

modulating the analog signal by a modulator into a modulated analog signal in a first frequency band;

converting the modulated analog signal to a further modulated analog signal by a network interface, the further modulated analog signal including analog data, and outputting the further modulated analog signal to the outside through the subscriber's line using the first frequency band, and converting the analog signal to a digital signal by a power line interface, the digital signal including packetized digital data, and outputting the digital signal to the information terminal through the power line using a second frequency band, the second frequency band being higher than the first frequency band, wherein the first frequency band and second frequency band do not overlap in frequency.

11. The communication method of claim 10, wherein the analog data is audio data, and the audio data is communicated to an exchange through the subscriber's line.

12. The communication method of claim 11, further comprising:

receiving sound as the audio data with a microphone, and outputting the audio data as sound with a speaker.

13. The communication method of claim 10, wherein the packetized digital data is audio data or video data or a combination of them.

14. The communication method of claim 10, wherein the digital signal is communicated to the information terminal according to CSMA.

15. The communication method of claim 14, wherein the CSMA is CSMA/CD.

16. The communication method of claim 14, wherein the CSMA is CSMA/CA.

17. The communication method of claim 10, wherein the digital signal is communicated to the information terminal according to TDMA.

18. The communication method of claim 10, the communication apparatus being connected to a plurality of information terminals, the plurality of information terminals including the information terminal, the communication method further comprising:

controlling a transmission right among the communication apparatus and the plurality of information terminals, wherein, when the communication apparatus gains the transmission right, the communication apparatus communicates to at least one of the plurality of information terminals.

* * * * *